(12) United States Patent
Park et al.

(10) Patent No.: US 11,676,580 B2
(45) Date of Patent: Jun. 13, 2023

(54) ELECTRONIC DEVICE FOR PROCESSING USER UTTERANCE AND CONTROLLING METHOD THEREOF

(71) Applicant: Samsung Electronics Co., Ltd., Suwon-si (KR)

(72) Inventors: Hyunbin Park, Suwon-si (KR); Jin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 17/245,751

(22) Filed: Apr. 30, 2021

(65) Prior Publication Data

US 2022/0319499 A1 Oct. 6, 2022

(30) Foreign Application Priority Data

Apr. 1, 2021 (KR) .......................... 10-2021-0042805

(51) Int. Cl.
*G10L 15/16* (2006.01)
*G10L 25/51* (2013.01)
(Continued)

(52) U.S. Cl.
CPC ................ *G10L 15/16* (2013.01); *G06F 7/50* (2013.01); *G06F 7/523* (2013.01); *G06F 7/5443* (2013.01);
(Continued)

(58) Field of Classification Search
CPC ... G10L 15/16; G10L 25/51; G10L 2015/088; G06F 7/50; G06F 7/523; G06F 7/5443; G06F 9/5027
(Continued)

(56) References Cited

U.S. PATENT DOCUMENTS 8,768,707 B2 7/2014 Mozer
8,831,936 B2 9/2014 Toman et al.
(Continued)

FOREIGN PATENT DOCUMENTS

CN 111279351 A * 6/2020 ............... G06F 7/02
KR 10-2018-0127065 A 11/2018
KR 10-2020-0023088 A 3/2020

OTHER PUBLICATIONS

M. Ichino, Y. Yamazaki and H. Yoshiura, "Speaker verification method for operation system of consumer electronic devices," in IEEE Transactions on Consumer Electronics, vol. 61, No. 1, pp. 96-102, Feb. 2015, doi: 10.1109/TCE.2015.7064116. (Year: 2015) (Year: 2015).*

(Continued)

*Primary Examiner* — Bharatkumar S Shah
(74) *Attorney, Agent, or Firm* — Jefferson IP Law, LLP

(57) ABSTRACT

An electronic device is provided. The electronic device includes a microphone, and at least one processor operatively connected to the microphone, wherein the at least one processor may include a buffer memory configured to store a first feature vector for a first voice signal obtained from the microphone as an inverse value, and an operation circuit configured to perform a norm operation for a first feature vector and a second feature vector, based on the second feature vector, based on a second voice signal streamed from the microphone and an inverse value of the first feature vector stored in the buffer memory, or calculate a similarity between the first feature vector and the second feature vector. In addition, various embodiments identified through the specification are possible.

20 Claims, 18 Drawing Sheets

(51) Int. Cl.
*G10L 25/30* (2013.01)
*G06F 9/50* (2006.01)
*G06F 7/544* (2006.01)
*G06F 7/523* (2006.01)
*G06F 7/50* (2006.01)
*G10L 15/08* (2006.01)

(52) U.S. Cl.
CPC ............ *G06F 9/5027* (2013.01); *G10L 25/30* (2013.01); *G10L 25/51* (2013.01); *G10L 2015/088* (2013.01)

(58) Field of Classification Search
USPC ........................................................ 704/200
See application file for complete search history.

(56) References Cited

U.S. PATENT DOCUMENTS

| | | | |
|---|---|---|---|
| 9,042,564 | B2 | 5/2015 | Jang |
| 10,832,680 | B2 | 11/2020 | Ganti et al. |
| 2016/0005422 | A1 | 1/2016 | Zad Issa et al. |
| 2017/0352353 | A1 | 12/2017 | Dachiraju et al. |
| 2020/0051580 | A1* | 2/2020 | Seo ...................... G10L 15/20 |
| 2020/0234717 | A1 | 7/2020 | Zhao et al. |
| 2021/0294840 | A1* | 9/2021 | Lee ...................... G10H 1/0008 |
| 2022/0078561 | A1* | 3/2022 | Lai ...................... H04R 25/505 |

OTHER PUBLICATIONS

Koch et al., "Siamese Neural Networks for One-Shot Image Recognition", University of Toronto. Toronto, Ontario, Canada, "Proceedings of the 32nd International Conference on Machine Learning, Lille, France, 2015. JMLR: W&CP vol. 37," 2015.

Chen, et al., "Eyeriss: An Energy-Efficient Reconfigurable Accelerator for Deep Convolutional Neural Networks", Feb. 2016.

Shan et al., "A 510nW 0.41V Low-Memory Low Computation Keyword-Spotting Chip Using Serial FFT-Based MFCC and Binarized Depthwise Separable Convolutional Neural Network in 28nm CMOS", Feb. 2020.

Liu et al., "EERA-KWS: A 163 TOPS/W Always-on Keyword Spotting Accelerator in 28nm CMOS Using Binary Weight Network and Precision Self-Adaptive Approximate Computing", May 2019.

International Search Report and Written Opinion dated Jul. 7, 2022, issued in International Patent Application No. PCT/KR2022/004741.

* cited by examiner

ELECTRONIC DEVICE FOR PROCESSING USER UTTERANCE AND CONTROLLING METHOD THEREOF

CROSS-REFERENCE TO RELATED APPLICATION(S)

This application is based on and claims priority under 35 U.S.C. § 119(a) of a Korean patent application number 10-2021-0042805, filed on Apr. 1, 2021, in the Korean Intellectual Property Office, the disclosure of which is incorporated by reference herein in its entirety.

BACKGROUND

1. Field

The disclosure relates to a technology for recognizing a user voice command and performing an operation corresponding to the user voice command.

2. Description of Related Art

An artificial intelligence system (or integrated intelligence system) refers to a computer system for implementing a human-level intelligence, and is configured such that a machine conducts autonomous learning and determination, and the rate of recognition increases in proportion to the degree of use. Artificial intelligence technologies include a machine learning (deep learning) technology that uses an algorithm for autonomously classifying/learning features of input data, and element technologies that simulate functions (for example, recognition and determination) of human brains by using a machine learning algorithm.

For example, the element technologies may include a linguistic understanding technology for recognizing human languages/letters, and a visual understanding technology for visually recognizing objects like human visual senses. In addition, the element technologies may include at least one of an inference/prediction technology for determining information and making logical inference and prediction, a knowledge expression technology for processing human experience data as knowledge data, and a motion control technology for controlling the movement of a robot. The linguistic understanding, among the above-mentioned element technologies, refers to a technology for recognizing human languages/letters and applying/processing the same, and may include natural language processing, machine translation, dialogue systems, questions and answers, voice recognition/synthesis, and the like.

Meanwhile, an electronic device equipped with an artificial intelligence system may analyze voice data that has been input by a user's utterance. In addition, the electronic device may determine a function to be performed by the electronic device or by an external electronic device connected thereto, based on the result of analysis, and may support the function to be performed by the electronic device or by the external electronic device.

Recently, an increasing number of electronic devices tend to provide voice recognition functions. After recognizing the user's utterance, the electronic device may execute a function embedded therein (for example, an application installed in the electronic device), thereby providing the user with a service. In addition, after recognizing the user's utterance, the electronic device may provide a relevant service through various third-party service providers. In this case, the electronic device may analyze voice data that has been input by the user utterance, and may provide a voice recognition service based on the result of analysis, which indicates that the voice data includes a keyword predetermined by the manufacturer of the electronic device.

The above information is presented as background information only to assist with an understanding of the disclosure. No determination has been made, and no assertion is made, as to whether any of the above might be applicable as prior art with regard to the disclosure.

SUMMARY

Meanwhile, various electronic devices providing voice recognition functions may execute functions embedded therein, thereby providing users with various services. However, an electronic device, upon receiving a predetermined voice keyword, may execute a voice assistant app to provide a voice recognition service. The predetermined voice keyword may be referred to as a start word. The electronic device may execute a command corresponding to the user utterance that follows the predetermined keyword. For example, the predetermined keyword may be configured by the manufacturer when the electronic device is manufactured. The user of the electronic device may be able to execute the voice assistant app only by making an utterance including the predetermined keyword.

If a predetermined voice command needs to be uttered to execute a voice recognition service function, a predetermined keyword needs to be uttered. Therefore, there is a drawback in that the voice assistant app cannot be executed based on a custom keyword that is customized for each of various users.

In addition, in order to execute the voice assistant app by using a personalized custom keyword, a large amount of custom keywords needs to be collected and to undergo deep learning by the electronic device or the server. Power consumption may increase if the electronic device conducts deep learning based on such a large amount of custom keywords. In addition, the deep learning, if conducted by the server, poses a problem of security vulnerability because a large amount of user voices is transmitted to the server.

Aspects of the disclosure are to address at least the above-mentioned problems and/or disadvantages and to provide at least the advantages described below. Accordingly, as aspect of the disclosure is to provide a technology for recognizing a user voice command and performing an operation corresponding to the user voice command.

Additional aspects will be set forth in part in the description which follows and, in part, will be apparent from the description, or may be learned by practice of the presented embodiments.

In accordance with an aspect of the disclosure, an electronic device is provided. The electronic device includes a microphone, and at least one processor operatively connected to the microphone, wherein the at least one processor is configured to include a buffer memory configured to store a first feature vector for a first voice signal obtained from the microphone as an inverse value, and an operation circuit configured to perform a norm operation for a first feature vector and a second feature vector, based on the second feature vector, based on a second voice signal streamed from the microphone and an inverse value of the first feature vector stored in the buffer memory, or calculate a similarity between the first feature vector and the second feature vector.

In accordance with another aspect of the disclosure, an operation method of an electronic device including an operation circuit configured to perform a norm operation and a similarity calculation is provided. The operation method includes inversely storing a first feature vector for a first voice signal obtained from a user of the electronic device through a microphone included in the electronic device in a memory included in the electronic device; performing a norm operation, based on a second feature vector based on a second voice signal obtained by streaming from the microphone and an inverse value of the first feature vector, and calculating a similarity between the first feature vector and the second feature vector, based on the operation result.

In accordance with another aspect of the disclosure, a keyword detection accelerator for performing a neural network operation is provided. The keyword detection accelerator includes an audio signal processor, a buffer memory, an operation circuit capable of performing a norm operation, and at least one processor operatively connected to the audio signal processor, the buffer memory, and the operation circuit, wherein the at least one processor stores a first feature vector for a first speech signal obtained through the audio signal processor as an inverse value in the buffer memory, obtains a second voice signal streamed through the audio signal processor, and performs a norm operation on the first feature vector and the second feature vector based on a second feature vector for the second speech signal and an inverse value of the first feature vector through the operation circuit, or calculates the similarity between the first feature vector and the second feature vector.

An electronic device and an operation method thereof, according to various embodiments, may configure a custom keyword for using a voice recognition service, by means of a user's input.

An electronic device and an operation method thereof, according to various embodiments, may provide a voice recognition service based on reception of voice data including a custom keyword from the user's utterance.

An electronic device and an operation method thereof, according to various embodiments, may perform an always-on custom keyword detection operation by using a keyword detection accelerator included in the electronic device.

An electronic device and an operation method thereof, according to various embodiments, may provide a voice recognition service based on a custom keyword, not through deep learning performed by a server, but through a keyword detection accelerator that implements one-shot learning (or more advanced form of network).

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
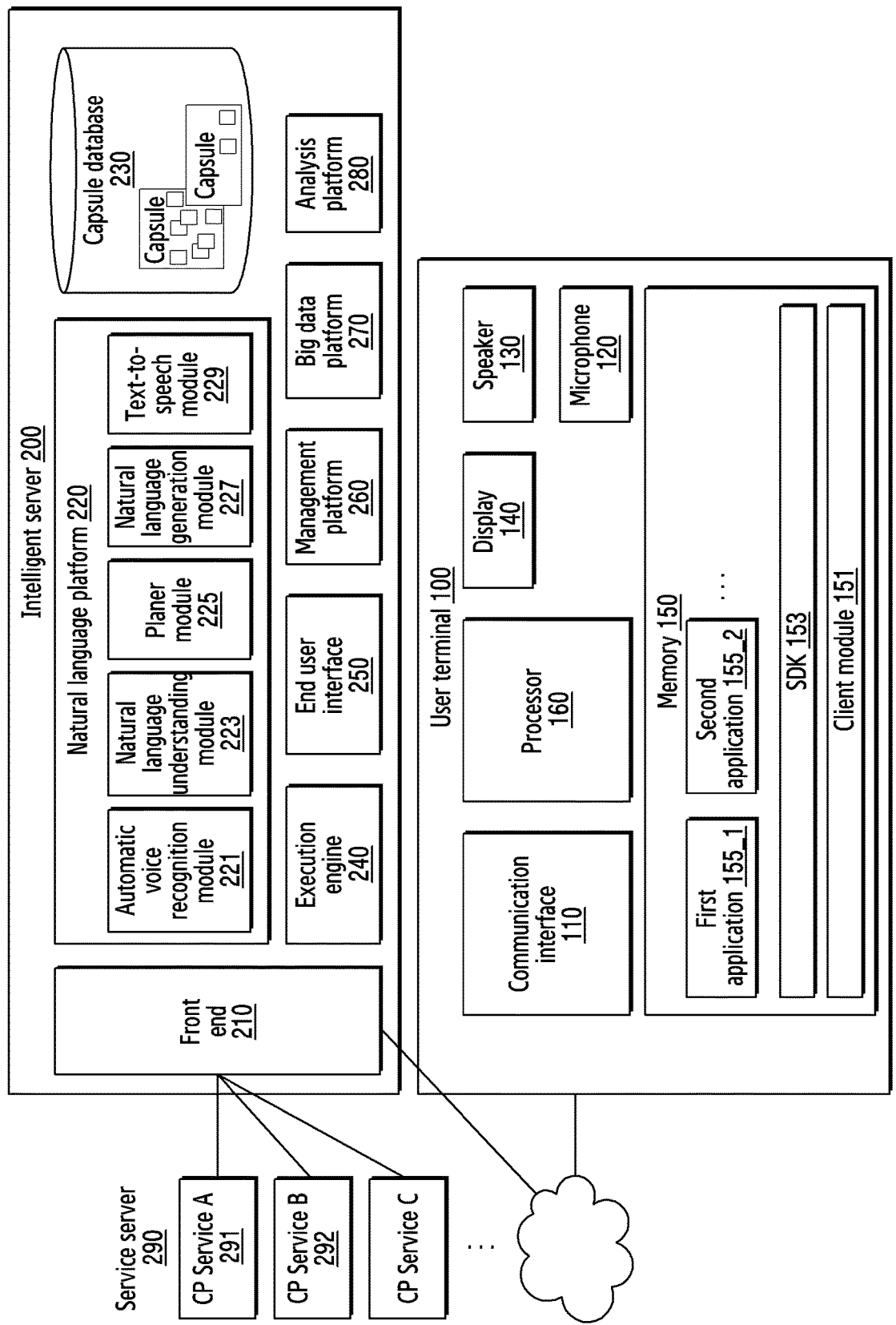
FIG. 1 is a block diagram illustrating an integrated intelligence system according to an embodiment of the disclosure.

FIG. 1 is a block diagram illustrating an integrated intelligence system according to an embodiment of the disclosure.

Referring to FIG. 1, an integrated intelligent system according to an embodiment may include a user terminal 100, an intelligent server 200, and a service server 290.

The user terminal 100 according to an embodiment may be a terminal device (or an electronic device) capable of being connected to the Internet, for example, a mobile phone, a smart phone, a personal digital assistant (PDA), a notebook computer, a TV, a white appliance, a wearable device, a head mounted device (HMD), or a smart speaker.

According to an embodiment, the user terminal 100 may include a communication interface 110, a microphone 120, a speaker 130, a display 140, a memory 150, or a processor 160. The above-listed components may be operatively or electrically connected to each other.

The communication interface 110 according to an embodiment may be configured to be connected to an external device to transmit and receive data. The microphone 120 according to an embodiment may receive sound (e.g., a user utterance) to convert the sound into an electric signal. The speaker 130 according to an embodiment may output an electric signal as sound (e.g., voice). The display 140 according to an embodiment may be configured to display an image or video. The display 140 according to an embodiment may also display a graphic user interface (GUI) of an executed application (or application program).

The memory 150 according to an embodiment may store a client module 151, a software development kit (SDK) 153, and a plurality of applications 155. The client module 151 and the SDK 153 may configure a framework (or a solution program) for performing a general function. In addition, the client module 151 or the SDK 153 may configure a framework for processing voice input.

The plurality of applications 155 may be programs for executing a designated function. According to an embodiment, the plurality of applications 155 may include a first application 155_1 and/or a second application 155_2. According to an embodiment, each of the plurality of applications 155 may include a plurality of operations for performing a designated function. For example, the applications may include an alarm application, a message application, and/or a schedule application. According to an embodiment, the plurality of applications 155 may be executed by the processor 160 to sequentially execute at least some of the plurality of operations.

The processor 160 according to an embodiment may control the overall operations of the user terminal 100. For example, the processor 160 may be electrically connected to the communication interface 110, the microphone 120, the speaker 130, and the display 140 to perform a designated operation. For example, the processor 160 may include at least one processor.

The processor 160 according to an embodiment may also execute a program stored in the memory 150 to perform a designated function. For example, the processor 160 may execute at least one of the client module 151 and the SDK 153 to perform the following operation for processing a voice input. The processor 160, for example, may control the operation of the plurality of applications 155 through the SDK 153. The following operations described as operations of the client module 151 or the SDK 153 may be operations performed by the execution of the processor 160.

The client module 151 according to an embodiment may receive a voice input. For example, the client module 151 may receive a voice signal corresponding to a user utterance detected through the microphone 120. The client module 151 may transmit the received voice input (e.g., voice signal) to the intelligent server 200. The client module 151 may transmit status information of the user terminal 100 to the intelligent server 200 together with the received voice input. The status information may be, for example, information on an execution status of an application.

The client module 151 according to an embodiment may receive a result corresponding to the received voice input. For example, when the intelligent server 200 can output a result corresponding to the received voice input, the client module 151 may receive the result corresponding to the received voice input. The client module 151 may display the received result on the display 140.

The client module 151 according to an embodiment may receive a plan corresponding to the received voice input. The client module 151 may display an execution result of the plurality of operations of the application on the display 140 according to the plan. For example, the client module 151 may sequentially display the execution results of the plurality of operations on the display. As another example, the user terminal 100 may display only a result obtained by executing the plurality of operations (e.g., a result of the last operation) on the display.

According to an embodiment, the client module 151 may receive a request from the intelligent server 200 to obtain information necessary to output a result corresponding to a voice input. According to an embodiment, the client module 151 may transmit the necessary information to the intelligent server 200 in response to the request.

The client module 151 according to an embodiment may transmit the result information obtained by executing the plurality of operations according to a plan to the intelligent server 200. The intelligent server 200 may identify that the received voice input has been correctly processed using the result information.

The client module 151 according to an embodiment may include a voice recognition module. According to an embodiment, the client module 151 may recognize a voice input performing a limited function through the voice recognition module. For example, the client module 151 may execute an intelligent application for processing the voice input by performing organic operations in response to a designated voice input (e.g., wake-up!).

The intelligent server 200 according to an embodiment may receive information related to a user's voice input from the user terminal 100 through a communication network. According to an embodiment, the intelligent server 200 may change data related to the received voice input into text data. According to an embodiment, the intelligent server 200 may generate at least one plan for performing a task corresponding to a user's voice input, based on the text data.

According to an embodiment, the plan may be generated by an artificial intelligent (AI) system. The artificial intelligence (AI) system may be one of a rule-based system, a neural network-based system (e.g., a feedforward neural network (FNN)), and/or a recurrent neural network (RNN).

Alternatively, the artificial intelligence (AI) system may be a combination of the above or another artificial intelligence (AI) system. According to an embodiment, the plan may be selected from a set of predefined plans, or may be produced in real time in response to a user request. For example, the artificial intelligence (AI) system may select at least one of a plurality of predefined plans.

The intelligent server 200 according to an embodiment may transmit a result according to the produced plan to the user terminal 100 or may transmit the produced plan to the user terminal 100. According to an embodiment, the user terminal 100 may display a result according to the plan on the display. According to an embodiment, the user terminal 100 may display a result obtained by executing an operation according to the plan on a display.

The intelligent server 200 of an embodiment may include a front end 210, a natural language platform 220, a capsule database 230, an execution engine 240, an end user interface 250, a management platform 260, and a big data platform (270), or an analysis platform (280).

The front end 210 according to an embodiment may receive a voice input received from the user terminal 100. The front end 210 may transmit a response corresponding to the voice input to the user terminal 100.

According to an embodiment, the natural language platform 220 may include an automatic speech recognition module (ASR module) 221, a natural language understanding module (NLU module) 223, a planner module 225, a natural language generation module (NLG module) 227, and/or a text to speech conversion module (TTS module) 229.

The automatic speech recognition module 221 according to an embodiment may convert the voice input received from the user terminal 100 into text data. The natural language understanding module 223 according to an embodiment may grasp a user's intention by using text data of the voice input. For example, the natural language understanding module 223 may grasp the user's intention by performing a syntactic analysis or a semantic analysis. The natural language understanding module 223 according to an embodiment may grasp the meaning of the word extracted from the voice input using the linguistic features (e.g., grammatical elements) of the morpheme or phrase, and may determine the user's intention by matching the meaning of the identified word with the intention.

The planner module 225 according to an embodiment may generate a plan using the intention and parameters determined by the natural language understanding module 223. According to an embodiment, the planner module 225 may determine a plurality of domains necessary to perform a task, based on the determined intention. The planner module 225 may determine a plurality of operations included in each of the plurality of domains determined based on the intention. According to an embodiment, the planner module 225 may determine a parameter required to execute the determined plurality of operations or a result value output by executing the plurality of operations. The parameter and the result value may be defined as a concept of a designated format (or class). Accordingly, the plan may include a plurality of operations and/or a plurality of concepts determined by the intention of the user. The planner module 225 may determine a relationship between the plurality of operations and the plurality of concepts in stages (or hierarchically). For example, the planner module 225 may determine an execution order of the plurality of operations determined based on the user's intention, based on the plurality of concepts. In other words, the planner module 225 may determine the execution order of the plurality of operations, based on the parameters required for executing the plurality of operations and the results output by executing the plurality of operations. Accordingly, the planner module 225 may generate a plan including related information (e.g., ontology) between the plurality of operations and the plurality of concepts. The planner module 225 may generate a plan using information stored in the capsule database 230 in which a set of relationships between the concepts and operations is stored.

The natural language generation module 227 according to an embodiment may change the designated information into information of a text format. The information changed in the format of text may have the format of natural language speech. The text-to-speech conversion module 229 according to an embodiment may change information of a text format into information of a voice format.

According to an embodiment, some or all of the functions of the natural language platform 220 may be implemented in the user terminal 100 as well.

The capsule database 230 may store information on a relationship between the plurality of concepts and operations corresponding to the plurality of domains. A capsule according to an embodiment may include a plurality of action objects (or operation information) and concept objects (or concept information) included in a plan. According to an embodiment, the capsule database 230 may store a plurality of capsules in the form of a concept action network (CAN). According to an embodiment, the plurality of capsules may be stored in a function registry included in the capsule database 230.

The capsule database 230 may include a strategy registry in which strategy information necessary for determining the plan corresponding to the voice input is stored. The strategy information may include reference information for determining one plan when there are a plurality of plans corresponding to the voice input. According to an embodiment, the capsule database 230 may include a follow up registry in which information of a follow up operation for suggesting a follow up operation to a user in a specified situation is stored. The follow up operation may include, for example, a follow up speech. According to an embodiment, the capsule database 230 may include a layout registry that stores layout information of information output through the user terminal 100. According to an embodiment, the capsule database 230 may include a vocabulary registry in which vocabulary information included in capsule information is stored. According to an embodiment, the capsule database 230 may include a dialog registry in which information about a dialog (or interaction) with a user is stored. The capsule database 230 may update an object stored through a developer tool. The developer tool may include, for example, a function editor for updating an action object or a concept object. The developer tool may include a vocabulary editor for updating vocabulary. The developer tool may include a strategy editor for producing and registering a strategy for determining a plan. The developer tool may include a dialog editor that produces a dialog with a user. The developer tool may include a follow up editor capable of activating a follow up target and editing subsequent speech that provides hints. The follow up target may be determined based on a currently configured target, user preference, or environmental conditions. In an embodiment, the capsule database 230 may be implemented in the user terminal 100 as well.

The execution engine 240 according to an embodiment may output a result using the produced plan. The end user interface 250 may transmit the output result to the user terminal 100. Accordingly, the user terminal 100 may receive the result and provide the received result to the user. The management platform 260 according to an embodiment may manage information used in the intelligent server 200. The big data platform 270 according to an embodiment may collect user data. The analysis platform 280 according to an embodiment may manage the quality of service (QoS) of the intelligent server 200. For example, the analysis platform 280 may manage the components and processing speed (or efficiency) of the intelligent server 200.

The service server 290 according to an embodiment may provide a designated service (e.g., food order or hotel reservation) to the user terminal 100. According to an embodiment, the service server 290 may be a server operated by a third party. The service server 290 according to an embodiment may provide information for producing a plan corresponding to the received voice input to the intelligent server 200. The provided information may be stored in the capsule database 230. In addition, the service server 290 may provide the result information according to the plan to the intelligent server 200.

In the integrated intelligent system described above, the user terminal 100 may provide various intelligent services to a user in response to the user input. The user input may include, for example, an input through a physical button, a touch input, or a voice input.

In an embodiment, the user terminal 100 may provide a voice recognition service through an intelligent application (or voice recognition application) stored therein. In this case, for example, the user terminal 100 may recognize a user utterance or voice input received through the microphone, and may provide a service corresponding to the recognized voice input to the user.

In an embodiment, the user terminal 100 may perform a designated operation alone or together with the intelligent server and/or service server, based on the received voice input. For example, the user terminal 100 may execute the application corresponding to the received voice input and may perform a designated operation through the executed application.

In an embodiment, when the user terminal 100 provides a service together with the intelligent server 200 and/or the service server 290, the user terminal may detect a user utterance using the microphone 120 and may generate a signal (or voice data) corresponding to the detected user utterance. The user terminal may transmit the voice data to the intelligent server 200 using the communication interface 110.

The intelligent server 200 according to an embodiment may generate a plan for performing a task corresponding to the voice input or a result of performing an operation according to the plan as a response to the voice input received from the user terminal 100. The plan may include, for example, a plurality of operations for performing the task corresponding to the user's voice input and/or a plurality of concepts related to the plurality of operations. The concept may be defined as a parameter input to the execution of the plurality of operations or a result value output from the execution of the plurality of operations. The plan may include related information between a plurality of operations and/or a plurality of concepts.

The user terminal 100 according to an embodiment may receive the response using the communication interface 110. The user terminal 100 may output a voice signal generated inside the user terminal 100 to the outside using the speaker 130, or may output an image generated inside the user terminal 100 to the outside using the display 140.

Figure 2:
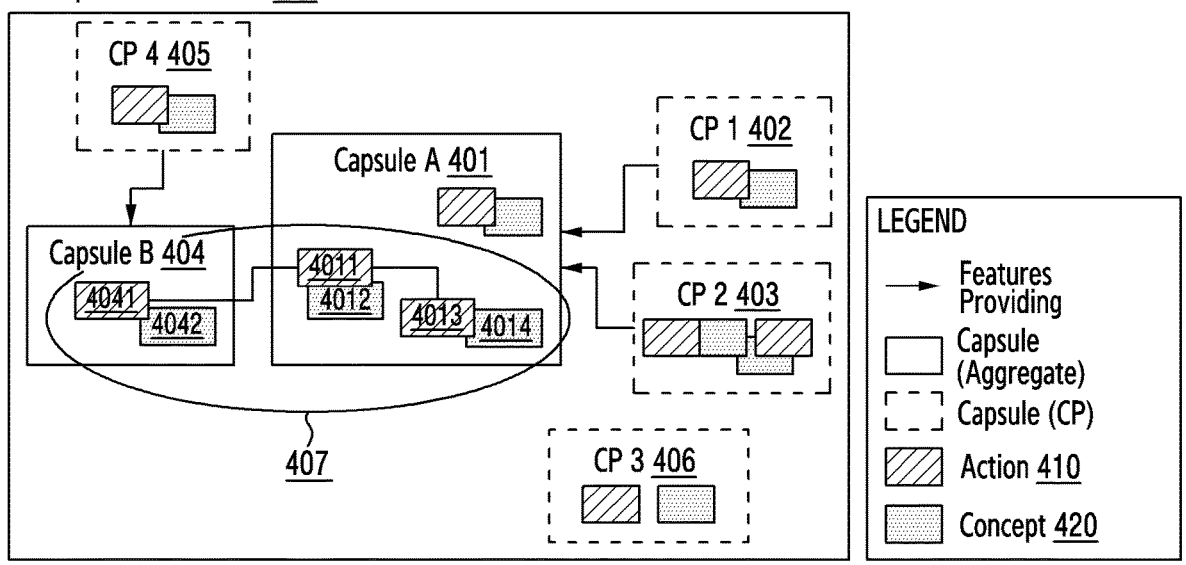
FIG. 2 is a diagram illustrating a form in which relationship information between a concept and an action is stored in a database according to an embodiment of the disclosure.

FIG. 2 is a diagram illustrating a form in which relationship information between a concept and an operation is stored in a database according to an embodiment of the disclosure.

The capsule database (e.g., capsule database 230) of the intelligent server 200 may store capsules in the form of a concept action network (CAN) 400. The capsule database may store an operation for processing a task corresponding to a user's voice input and a parameter necessary for the operation in the form of a concept action network (CAN).

Referring to FIG. 2, a capsule database may store a plurality of capsules (capsule A 401, capsule B 404, capsule CP 1 402, capsule CP 2 403, capsule CP 4 405, and capsule CP 3 406) corresponding to each of a plurality of domains (e.g., applications). According to an embodiment, one capsule (e.g., capsule A 401) may correspond to one domain (e.g., location (geo), application). In addition, at least one service provider (e.g., CP service A 291 or CP service B 292) for performing a function for a domain related to the capsule may correspond to one capsule. According to an embodiment, one capsule may include at least one operation 410 and at least one concept 420 for performing a designated function.

The natural language platform 220 may generate a plan for performing a task corresponding to a received voice input using a capsule stored in a capsule database. For example, the planner module 225 of the natural language platform may generate a plan using the capsules stored in the capsule database. For example, a plan 407 may be generated using operations 4011 and 4013 and concepts 4012 and 4014 of the capsule A 401 and an operation 4041 and a concept 4042 of the capsule B 404.

Figure 3:
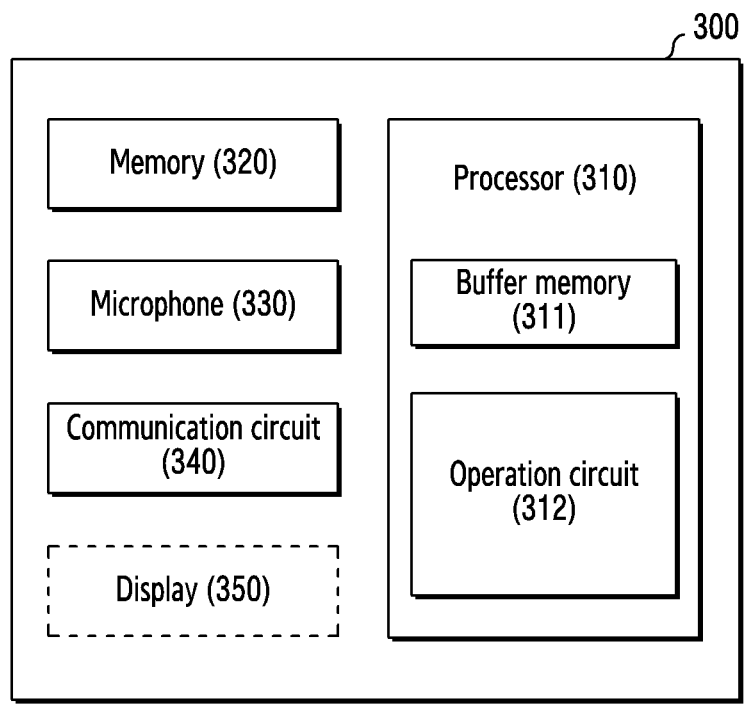
FIG. 3 is a block diagram of an electronic device according to an embodiment of the disclosure.

FIG. 3 is a block diagram of an electronic device according to an embodiment of the disclosure.

Referring to FIG. 3, an electronic device 300 (e.g., a user terminal 100 of FIG. 1) may include at least one processor 310, a memory 320, a microphone 330, a communication circuit 340, and a display 350. The components listed above may be operatively or electrically connected to each other. The components of the electronic device 300 illustrated in FIG. 3 may be partially deformed, deleted, or added as an example. According to an embodiment, the electronic device 300 may include all or a portion of the components of the user terminal 100 of FIG. 1. According to various embodiments, the electronic device 300 may communicate with the intelligent server 200 of FIG. 1 and may individually or jointly perform operations according to various embodiments.

According to an embodiment, the processor 310 may be electrically or operatively connected to the memory 320, the microphone 330, the communication circuit 340, and the display 350. According to an embodiment, the processor 310 may control at least one other component of the electronic device 300 and/or perform an operation or data processing related to communication using instructions stored in the memory 320. According to an embodiment, the processor 310 may include at least one of a central processing unit (CPU), a graphic processing unit (GPU), a micro controller unit (MCU), a sensor hub, a supplementary processor, a communication processor, an application processor, an application specific integrated circuit (ASIC), field programmable gate arrays (FPGA), and a neural processing unit (NPU) and may have a plurality of cores.

According to an embodiment, the NPU included in the processor 310 may perform neural network-based tasks required according to execution of an application. According to an embodiment, the NPU may be included in the application processor. The neural networks may include at least one of various types of neural network models including convolution neural network (CNN), region with convolution neural network (R-CNN), region proposal network (RPN), recurrent neural network (RNN), stacking-based deep neural network (S-DNN), state-space dynamic neural network (S-SDNN), deconvolution network, deep belief network (DBN), restricted Boltzmann machine (RBM), fully convolutional network, long short-term memory (LSTM) network, and classification network.

According to an embodiment, the processor 310 may perform a neural network operation, based on received input data. For example, neural network operation may include convolution, pooling, an activation function operation, a dot product operation, a vector operation, and a sigmoid operation.

The neural network may include at least one layer. The at least one layer may be a linear layer (e.g., a convolutional layer) or a nonlinear layer (e.g., a polling layer). The electronic device 300 according to an embodiment may perform a neural network operation through a convolution layer. The convolutional layer according to an embodiment may generate a feature vector, based on an input value. For example, the convolution layer may generate a feature vector corresponding to an input user voice signal.

According to an embodiment, the processor 310 may include a specialized hardware structure for executing a voice recognition service. For example, the processor 310 may include a buffer memory 311 and an operation circuit 312. According to various embodiments, the processor 310 may include various components for determining whether to execute a voice recognition service.

According to an embodiment, the buffer memory 311 may store programs and/or data. For example, the buffer memory 311 may store operation parameters for a neural network, input data (e.g., feature vectors), and output data (e.g., similarity). According to an embodiment, the operation circuit 312 may perform an arithmetic operation (e.g., a norm operation), based on input data (e.g., feature vector) received from the buffer memory 311 and store the operation result (e.g., similarity) in the buffer memory 311. A description of the buffer memory 311 and the operation circuit 312 according to an embodiment will be described later in detail with reference to FIG. 4.

According to an embodiment, the processor 310 may receive a voice input by a user's utterance through the microphone 330 and may process the received voice input. In addition, the processor 310 may convert the received voice input into text data and provide a voice recognition service (e.g., a voice assistant) based on the text data. For example, in response to the received voice input including a keyword for executing the voice assistant application, the processor 310 may execute the voice assistant application. The processor 310 according to an embodiment may execute the voice assistant application in response to input of a custom keyword from the user of the electronic device 300. An operation in which the processor 310 executes the voice assistant application will be described in detail later with reference to FIGS. 9 to 12.

In order to perform the above-described functions, the processor 310 may include the natural language platform 220 described with reference to FIG. 1, or may include a specialized hardware structure for performing the above-described functions.

According to an embodiment, the memory 320 may store instructions for processing data or controlling components of the electronic device 300 to perform an operation of the electronic device 300 when the processor 310 executes. According to an embodiment, the memory 320 may store at least one application capable of performing various functions. According to an embodiment, the memory 320 may store instructions and data related to processing of a user's voice input received through the microphone 330. For example, the data related to an input user's voice signal and/or a voice recognition service execution may be stored.

According to an embodiment, the memory 320 may store operation parameters used to calculate a keyword similarity for executing the voice assistant application. For example, the memory 320 may store data on a custom keyword configured by the processor 310 and/or data on a keyword detection sensitivity input from the user of the electronic device 300.

According to an embodiment, the microphone 330 may receive a user utterance and convert the same into an electrical signal. For example, the microphone 330 may receive a user utterance for executing a voice recognition service from the user of the electronic device 300 and convert the same into an electrical signal. According to an embodiment, the processor 310 may identify a keyword of the voice signal received from the user using the electrical signal received through the microphone 330. For example, the processor 310 may identify whether the keyword of the voice signal received from the user is a custom keyword for executing the voice recognition service. According to an embodiment, when the keyword of the received voice signal is a keyword for executing the voice recognition service, the processor 310 may execute the voice assistant application. According to an embodiment, an operation of the processor 310 to determine whether the keyword of the received voice signal is a keyword for executing the voice recognition service will be described in detail later with reference to FIGS. 4 to 6, 7A to 7D, and 8.

According to an embodiment, the electronic device 300 may communicate with the intelligent server 200 described with reference to FIG. 1 through the communication circuit 340. The electronic device 300 may transmit voice data, based on the user utterance to the intelligent server 200 through the communication circuit 340, and the electronic device 300 may receive a response from the intelligent server 200 using the communication circuit 340. For example, the electronic device 300 may transmit voice data, based on the user utterance to the intelligent server 200 through the communication circuit 340 and receive text data generated by the automatic speech recognition module 221.

According to an embodiment, the display 350 may display various types of contents (e.g., text, images, videos, icons, and/or symbols). According to an embodiment, the display 350 may include a liquid crystal display (LCD), a light emitting diode (LED) display, or an organic light emitting diode (OLED) display. According to an embodiment, the processor 310 may control the display 350 to display various contents related to execution of the voice recognition service. For example, the processor 310 may control the display 350 to display a screen requesting input of a keyword for executing a speech recognition service. According to various embodiments, an operation in which the display 350 displays the contents related to the execution of the voice recognition service will be described later with reference to FIGS. 13 and 14.

According to an embodiment, the processor 310 may receive a first voice signal corresponding to a keyword for executing a voice recognition service from a user through the microphone 330, and store a first feature vector for the first voice signal as an inverse value in the buffer memory

311. The first feature vector according to an embodiment may represent a vector produced by inputting the first voice signal to the convolution layer.

According to an embodiment, the processor 310 may obtain a second voice signal obtained by streaming through the microphone 330 and generate a second feature vector for the second voice signal. According to an embodiment, the second feature vector may represent a vector generated by inputting the second voice signal to the convolution layer.

According to an embodiment, the processor 310 may perform various operations, based on the inverse value of the first feature vector and the second feature vector stored in the buffer memory 311. For example, the processor 310 may perform a norm operation on the inverse value of the first feature vector and the second feature vector or may calculate the inverse value of the first feature vector and a similarity of the second feature vector using the operation circuit 312. The processor 310 according to an embodiment may execute the voice assistant application, based on the similarity calculation result.

Figure 4:
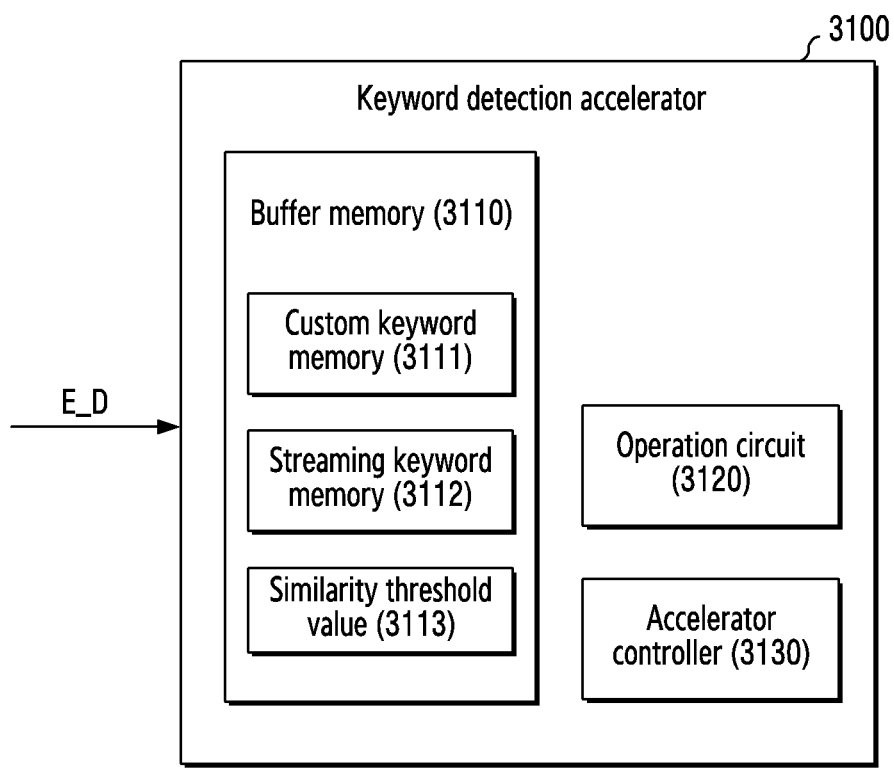
FIG. 4 is a block diagram of a keyword detection accelerator according to an embodiment of the disclosure.

FIG. 4 is a block diagram of a keyword detection accelerator according to an embodiment of the disclosure.

Referring to FIG. 4, a keyword detection accelerator 3100 may include a buffer memory 3110, an operation circuit 3120, and an accelerator controller 3130. The keyword detection accelerator 3100 and the accelerator controller 3130 according to an embodiment may be included in the processor 310 described with reference to FIG. 3. According to an embodiment, the keyword detection accelerator 3100 may be included in an application processor. According to various embodiments, the keyword detection accelerator 3100 and the accelerator controller 3130 may perform the operations of the processor 310 described with reference to FIG. 3. According to an embodiment, the accelerator controller 3130 may control the operation of the keyword detection accelerator 3100. The accelerator controller 3130 according to an embodiment may be driven with low power.

The keyword detection accelerator 3100 according to an embodiment may identify whether the custom keyword for executing the voice assistant application is included in the user voice signal obtained through the microphone 330. In addition, the keyword detection accelerator 3100 may transmit an interrupt signal for executing the voice assistant application to the processor 310 in response to the custom keyword being included. For example, the accelerator controller 3130 included in the keyword detection accelerator 3100 may transmit an interrupt signal for executing the voice assistant application to the central processing unit (CPU). For example, the accelerator controller 3130 may transmit the interrupt signal to the central processing unit (CPU), the internal bus, and the memory controller (DRAM controller) included in the processor 310. The processor 310 according to an embodiment may execute a voice assistant application, based on the interrupt signal.

The buffer memory 3110 according to an embodiment may store a custom keyword 3111, a streaming keyword 3112, and a similarity threshold value 3113. According to an embodiment, the keyword detection accelerator 3100 may receive external data E_D from various components included in the electronic device 300. The external data according to an embodiment may include a user's voice signal obtained through the microphone 330, data on keyword detection sensitivity input from the user, and/or data stored in the memory 320. According to various embodiments, the external data may include various data.

According to an embodiment, the accelerator controller 3130 may store the external data E_D in the buffer memory 3110 in response to receiving the external data E_D. According to an embodiment, the external data E_D may include a feature vector for a voice signal input from a user. According to an embodiment, the feature vector may be obtained using the convolutional layer described with reference to FIG. 3. For example, the processor 310 may obtain a feature vector for a voice signal using computing hardware (e.g., CPU, GPU, and/or digital signal processor (DSP)). According to an embodiment, the accelerator controller 3130 may store a first feature vector for the first voice signal input in the custom keyword 3111 according to the custom keyword configuring operation of the electronic device 300. According to an embodiment, the accelerator controller 3130 may obtain a first feature vector from the memory 320 and store the obtained first feature vector in the buffer memory 3110 in an inverse manner. According to various embodiments, the custom keyword 3111, the streaming keyword 3112, and the similarity threshold value 3113 stored in the buffer memory 3110 may be stored in one buffer memory or in a plurality of buffer memories, respectively.

According to an embodiment, the accelerator controller 3130 may store a second feature vector for a second voice signal streamed through the microphone 330 in the streaming keyword 3112. According to an embodiment, the accelerator controller 3130 may receive data on keyword detection sensitivity from a user, and store an inverse value thereof as the similarity threshold value 3113 in the buffer memory 3110. For example, through a touch input through the display 350, data on keyword detection sensitivity may be obtained from a user, and the obtained data may be stored in the buffer memory 3110 as a similarity threshold value 3113. According to an embodiment, as the magnitude of the absolute value for the similarity threshold increases, the voice assistant application may be executed when the similarity between the keyword for executing the voice assistant application included in the first voice signal and the keyword included in the second voice signal is high.

According to an embodiment, the operation circuit 3120 may perform various operations executed by the keyword detection accelerator. According to various embodiments, the operation circuit 3120 may include at least one multiplexer, at least one multiplier, at least one adder, at least one accumulator, and/or at least one two's complement circuit.

According to an embodiment, the keyword detection accelerator 3100 may determine whether a keyword for executing the voice assistant application is included in the second voice signal obtained through streaming. For example, the keyword detection accelerator 3100 may generate an interrupt signal for execution of the voice assistant application by computing the similarity of a first feature vector corresponding to a preconfigured custom keyword and a second feature vector corresponding to a second voice signal obtained through streaming, and comparing the calculated similarity and similarity threshold value 3113. According to an embodiment, the accelerator controller 3130 may calculate a similarity between the inverse of the first feature vector and the second feature vector through the operation circuit 3120. According to an embodiment, the similarity between the inverse of the first feature vector and the second feature vector may be determined through a norm operation. According to an embodiment, the accelerator controller 3130 may determine a similarity by performing a sigmoid operation on a norm operation result for the first feature vector and the second feature vector.

According to an embodiment, the accelerator controller 3130 may compare the similarity and a threshold value determined using the operation circuit 3120 and transmit an interrupt signal for executing the voice assistant application to the central processing unit (CPU) when the similarity is greater than the threshold value. According to various embodiments, a process in which the operation circuit 3120 performs a norm operation, based on the first feature vector and the second feature vector and a process of comparing the similarity and the threshold value will be described later in detail with reference to FIGS. 6, 7A to 7D, and 8.

Figure 5:
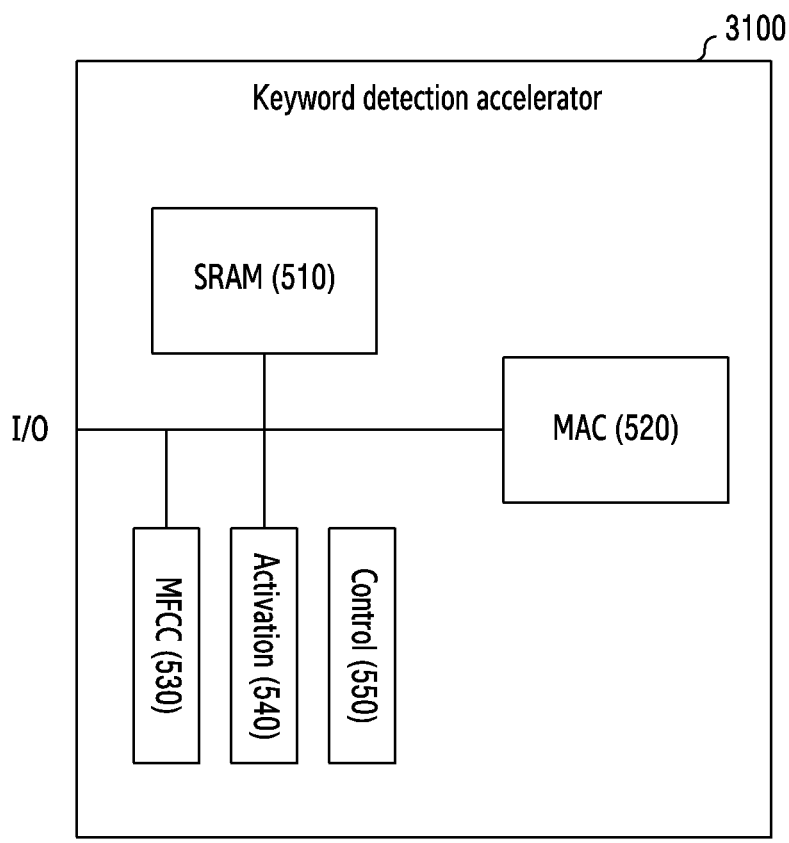
FIG. 5 is a diagram illustrating a configuration of a keyword detection accelerator according to an embodiment of the disclosure.

FIG. 5 is a diagram illustrating a configuration of a keyword detection accelerator according to an embodiment of the disclosure.

Referring to FIG. 5, a keyword detection accelerator 3100 may include an SRAM 510, an mel frequency cepstral coefficients (MFCC) 530, an Activation 540, a Control 550, and a MAC 520. According to an embodiment, the SRAM 510 may be included in the buffer memory 3110. According to an embodiment, the Control 550 may be included in the accelerator controller 3130, and the MAC 520 may be included in the operation circuit 3120. According to an embodiment, the MFCC 530 may divide a user's voice signal input through the microphone 330 into a predetermined section and analyze a spectrum to extract a feature. The Activation 540 according to an embodiment may perform an activation function operation through an active layer. For example, the Activation 540 may perform an operation using a sigmoid function and a Rectified Linear Unit (ReLU) function.

According to an embodiment, in order to determine whether to execute the voice assistant app, the control 550 may read a value of the inverse of the first feature vector and a similarity threshold corresponding to the custom keyword stored in the memory 320 and store it in the SRAM 510. According to an embodiment, the control 550 may perform a norm operation on a value of the second feature vector and the inverse of the first feature vector for the second voice signal obtained by streaming through the MFCC 530 through the MAC 520. In addition, the Control 550 may control the result of the norm operation through the MAC 520 to perform a sigmoid operation through the Activation 540. According to an embodiment, values for the first feature vector and the second feature vector output using the sigmoid operation may be expressed as similarities.

According to an embodiment, the control 550 may compare the similarity obtained through the Activation 540 and the similarity threshold value stored in the SRAM 510 through the MAC 520. For example, the control 550 may perform a subtraction operation on the similarity and the similarity threshold through the MAC 520. According to an embodiment, when the comparison result of the similarity and the similarity threshold value obtained through the MAC 520 is positive, the control 550 may transmit an interrupt signal for executing the voice assistant application to the central processing unit. According to another embodiment, when the comparison result of the similarity and the similarity threshold value obtained through the MAC 520 is negative, the control 550 may be determined that there is no voice input for executing the voice assistant application.

Figure 6:
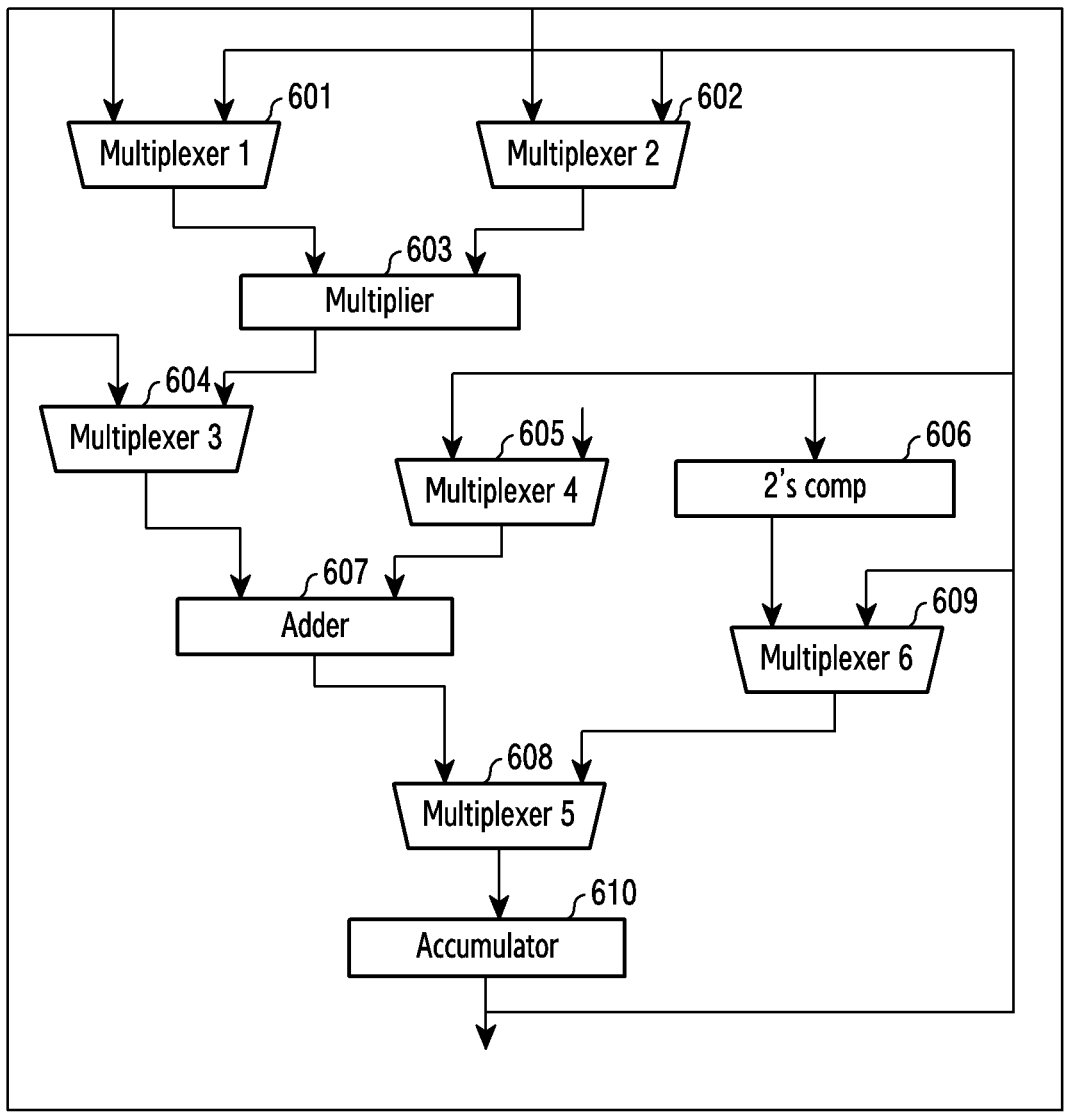
FIG. 6 is a diagram illustrating a logical operation structure of an operation circuit according to an embodiment of the disclosure.

FIG. 6 is a diagram illustrating a logical operation structure of an operation circuit according to an embodiment of the disclosure.

Referring to FIG. 6, an operation circuit 312 may include first to sixth multiplexers 601, 602, 604, 605, 608, and 609, a multiplier 603, an adder 607, an accumulator 610, and/or a two's complement circuit 606. According to various embodiments, the components included in the operation circuit 312 may be added or omitted. According to an embodiment, the operation circuit 312 may perform an arithmetic operation on data represented by binary numbers.

The first multiplexer 601 and the second multiplexer 602 according to an embodiment may select and output one of data transmitted from another component included in the electronic device 300 and data transmitted from the accumulator 610. The accumulator 610 (e.g., a register) according to an embodiment may temporarily store a result of an operation performed by the operation circuit 312 and/or a parameter value used for the operation. Data output from the first multiplexer 601 according to an embodiment may be input to the multiplier 603.

The multiplier 603 according to an embodiment may perform a multiplication operation on input data and output a multiplication result. According to an embodiment, the multiplication result may be input to the third multiplexer 604. The third multiplexer 604 may select and output one of a multiplication result input from the multiplier 603 and data transmitted from other components included in the electronic device 300. The data selected through the third multiplexer 604 may be input to the adder 607. According to an embodiment, the fourth multiplexer 605 may select and output one of data transmitted from the accumulator 610 and "0". The data selected through the fourth multiplexer 605 may be input to the adder 607. The adder 607 according to an embodiment may perform an addition operation of data input from the third multiplexer 604 and the fourth multiplexer 605 and output the addition result.

According to an embodiment, the two's complement circuit 606 may perform a two's complement operation on data output from the accumulator 610. The operation circuit 312 may output an absolute value of input data through a two's complement operation. For example, the two's complement circuit 606 may check the sign bit of the input data and determine whether the input data is positive or negative. For example, the two's complement circuit 606 may determine whether the input data is positive or negative based on the most significant bit of the input data. According to an embodiment, if the sign bit of the input data is "0", it may be determined as a positive number, and if the input data is "1", it may be determined as a negative number. According to an embodiment, if the sign bit of the input data is "0", the two's complement circuit 606 may output the input data as it is, and if the sign bit is "1", the two's complement circuit 606 may perform a two's complement operation.

According to an embodiment, the sixth multiplexer 609 may receive absolute value data from the two's complement circuit 606 and arbitrary data output and select one to output the selected dat. The output data may be input to the fifth multiplexer 608. According to an embodiment, the fifth multiplexer 608 may select and output one of the data input from the adder 607 and the sixth multiplexer 609. The output data may be stored in the accumulator 610.

According to an embodiment, in the operation circuit, the operation circuit includes a plurality of multiplexers (e.g., the first to sixth multiplexers 601, 602, 604, 605, 608, and 609), at least one register for storing data output in the operation, at least one multiplier (e.g., the multiplier 603), at least one adder (e.g., the adder 607), at least one accumulator (e.g., the accumulator 610), and a two's complement circuit (e.g., the two's complement circuit 606). The at least one multiplexer (e.g., the third multiplexer 604) among the plurality of multiplexers may output an inverse value −h1 of a first feature vector or a similarity threshold value −Th, based on a first voice signal related to configuring a custom keyword. The two's complement circuit may perform an absolute value operation on the subtraction data h2−h1, which is the result of performing the addition operation of the second feature vector h2, based on the inverse value −h1 of the first feature vector and the second voice signal to output the result, and may calculate the similarity between the first voice signal and the second voice signal by performing a norm operation through at least one multiplier, at least one adder, and at least one accumulator. According to various embodiments, the operation circuit 312 may include a register for storing data output in each operation. According to an embodiment, the first to sixth multiplexers 601, 602, 604, 605, 608, and 609 may select and output one of input data, based on the control signal transmitted from the accelerator controller 3130 described with reference to FIG. 4. According to various embodiments, the configuration of the operation circuit 312 may be changed within a uniform range capable of outputting the same result value.

Figure 7A:
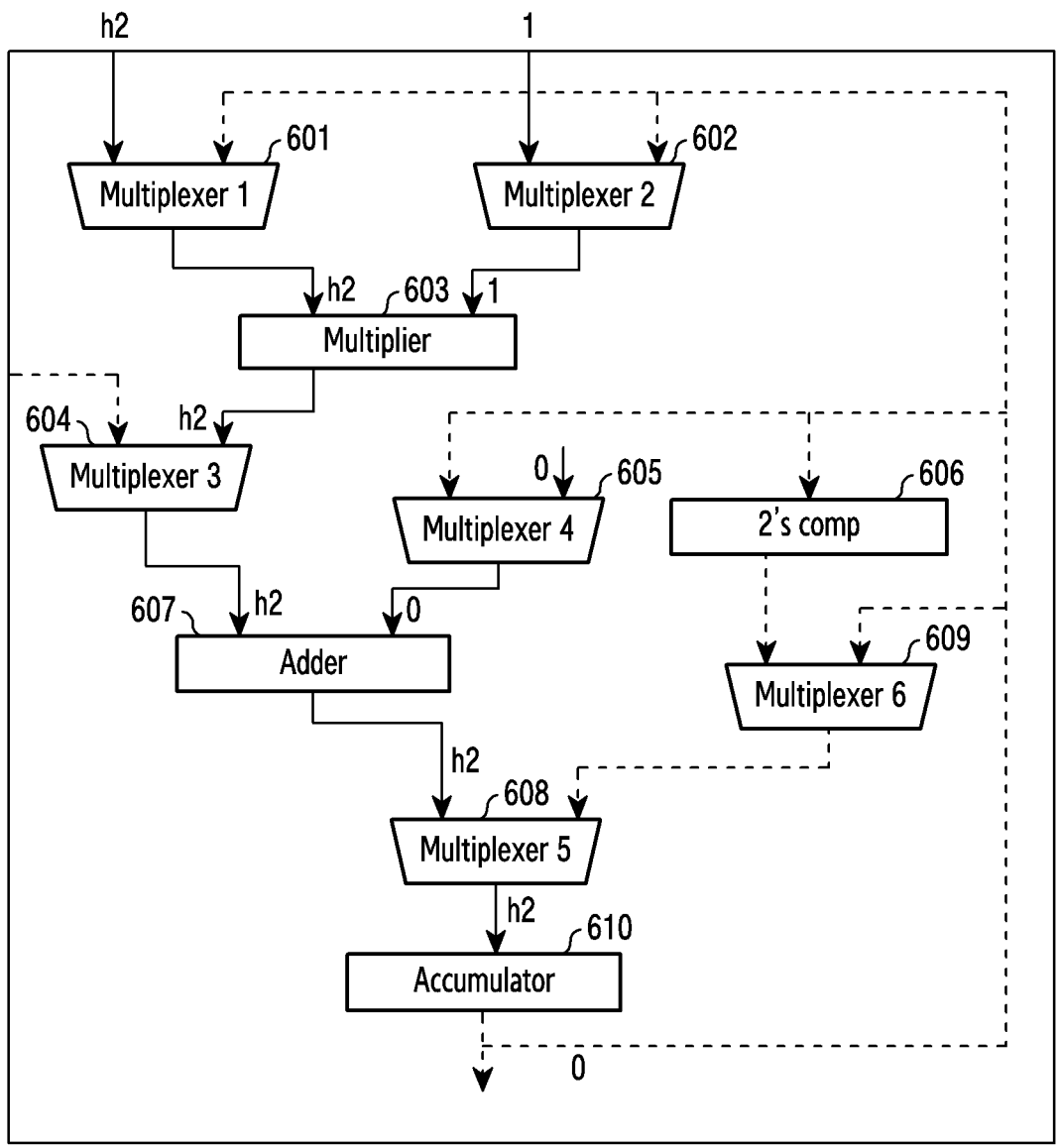
FIG. 7A is a diagram illustrating an operation process for a second feature vector according to an embodiment of the disclosure.

FIG. 7A is a diagram illustrating an operation process for a second feature vector according to an embodiment of the disclosure.

Referring to FIG. 7A, in order to perform a norm operation on the first feature vector and the second feature vector, the operation circuit 312 may store the second feature vector in the accumulator 610. Since the description of the configuration of the operation circuit 312 is the same as that described with reference to FIG. 6, duplicate descriptions are omitted.

According to an embodiment, the operation circuit 312 may receive the second feature vector h2 and "1" described with reference to FIG. 3 as input data. The second feature vector h2 according to an embodiment may correspond to a second voice signal received by streaming through the microphone 330. The first multiplexer 601 according to an embodiment may output the received second feature vector h2 to the multiplier 603, and the second multiplexer 602 may output the input "1" to the multiplier 603. The multiplier 603 according to an embodiment may perform a multiplication operation on the second feature vector h2 and "1". Accordingly, the multiplier 603 may output the second feature vector h2 through the above operation.

According to an embodiment, the second feature vector h2 output from the multiplier 603 may be input to the third multiplexer 604. According to an embodiment, the third multiplexer 604 may output the input second feature vector h2 to the adder 607. The fourth multiplexer 605 according to an embodiment may receive '0' and output it to the adder 607. Accordingly, the adder 607 may receive the second feature vector h2 and "0". The adder 607 according to an embodiment may perform an addition operation on the second feature vector and "0" and output the addition result to the fifth multiplexer 608. Accordingly, the fifth multiplexer 608 may receive the second feature vector h2.

According to an embodiment, the second feature vector h2 input to the fifth multiplexer 608 may be output to the accumulator 610. The accumulator 610 according to an embodiment may store the second feature vector h2.

Figure 7B:
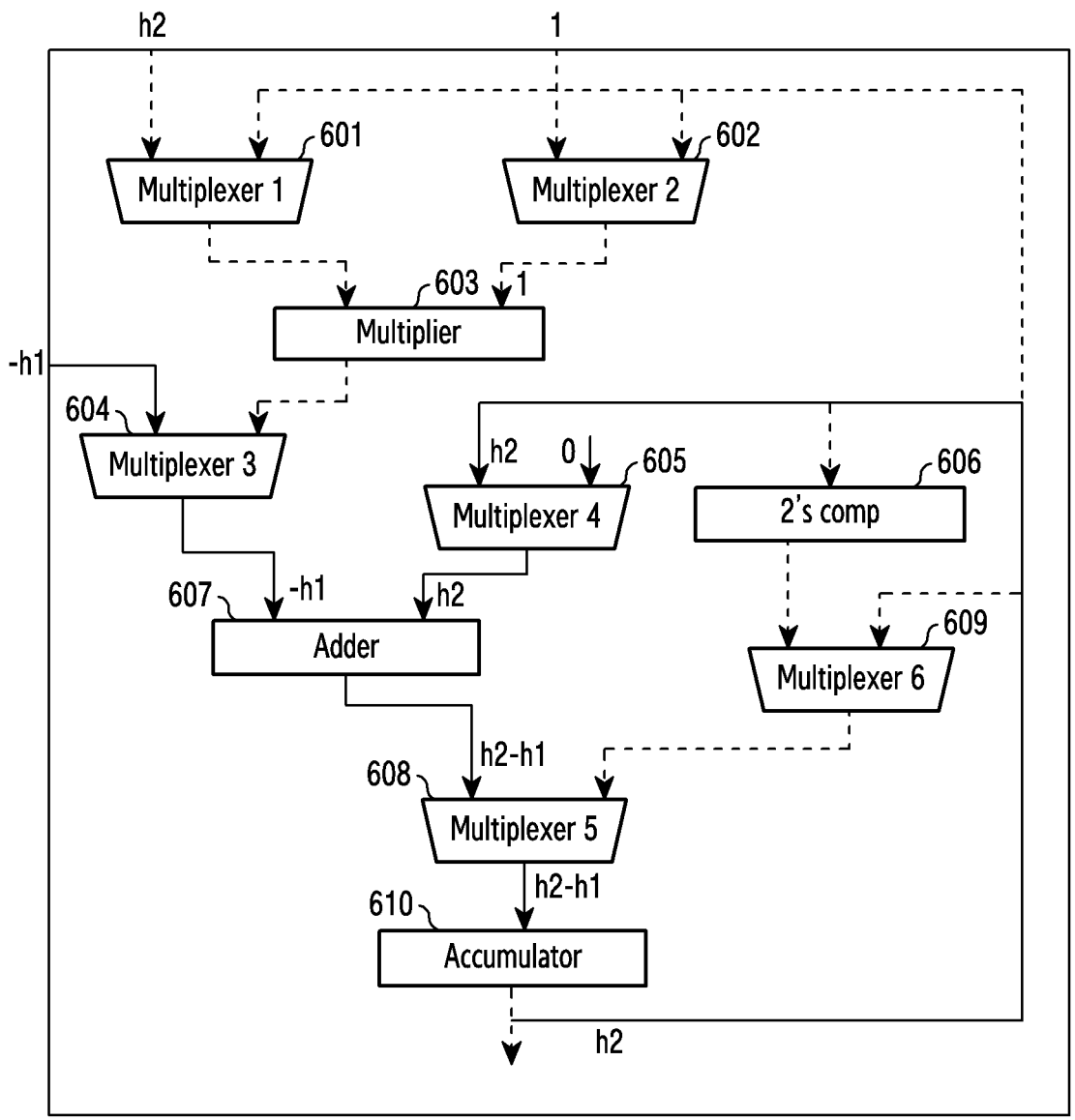
FIG. 7B is a diagram illustrating an operation process for a first feature vector and a second feature vector according to an embodiment of the disclosure.

FIG. 7B is a diagram illustrating an operation process for a first feature vector and a second feature vector according to an embodiment of the disclosure.

Referring to FIG. 7B, in order to perform a norm operation on a first feature vector and a second feature vector, an operation circuit 312 may perform a subtraction operation on a first feature vector and a second feature vector, and store the subtraction result in an accumulator 610. Since the description of the configuration of the operation circuit 312 is the same as that described with reference to FIG. 6, duplicate descriptions are omitted.

According to an embodiment, the operation circuit 312 may receive the inverse value −h1 of the first feature vector described with reference to FIG. 3 from the buffer memory 3110 through the accelerator controller 3130. According to an embodiment, in order to perform the keyword similarity operation, based on the first feature vector and the second feature vector, the accelerator controller 3130 may load an inverse value of the first feature vector stored in the memory 320 into the buffer memory 311 and input a value of the inverse of the first feature vector to the operation circuit 312.

The inverse value −h1 of the first feature vector according to an embodiment may correspond to a first voice signal received through the microphone 330 in the operation of configuring a custom keyword. The third multiplexer 604 according to an embodiment may output the received inverse value −h1 of the first feature vector to the adder 607. According to an embodiment, the accumulator 610 may output the second feature vector h2 stored in the accumulator 610 to the fourth multiplexer 605 with reference to FIG. 7A.

The fourth multiplexer 605 according to an embodiment may select and output the second feature vector h2 from the input second feature vector h2 and "0". The outputted second feature vector h2 may be input to the adder 607.

According to an embodiment, the adder 607 may perform an addition operation on the inverse value −h1 of the first feature vector and the second feature vector h2 input through the third multiplexer 604. For example, the adder 607 may perform an addition operation on the inverse value −h1 of the first feature vector and the second feature vector h2, and output subtraction data h2−h1 as a result of the addition operation to the fifth multiplexer 608.

According to an embodiment, the subtraction data h2−h1 input to the fifth multiplexer 608 may be output to the accumulator 610. The accumulator 610 according to an embodiment may store subtraction data h2−h1.

Figure 7C:
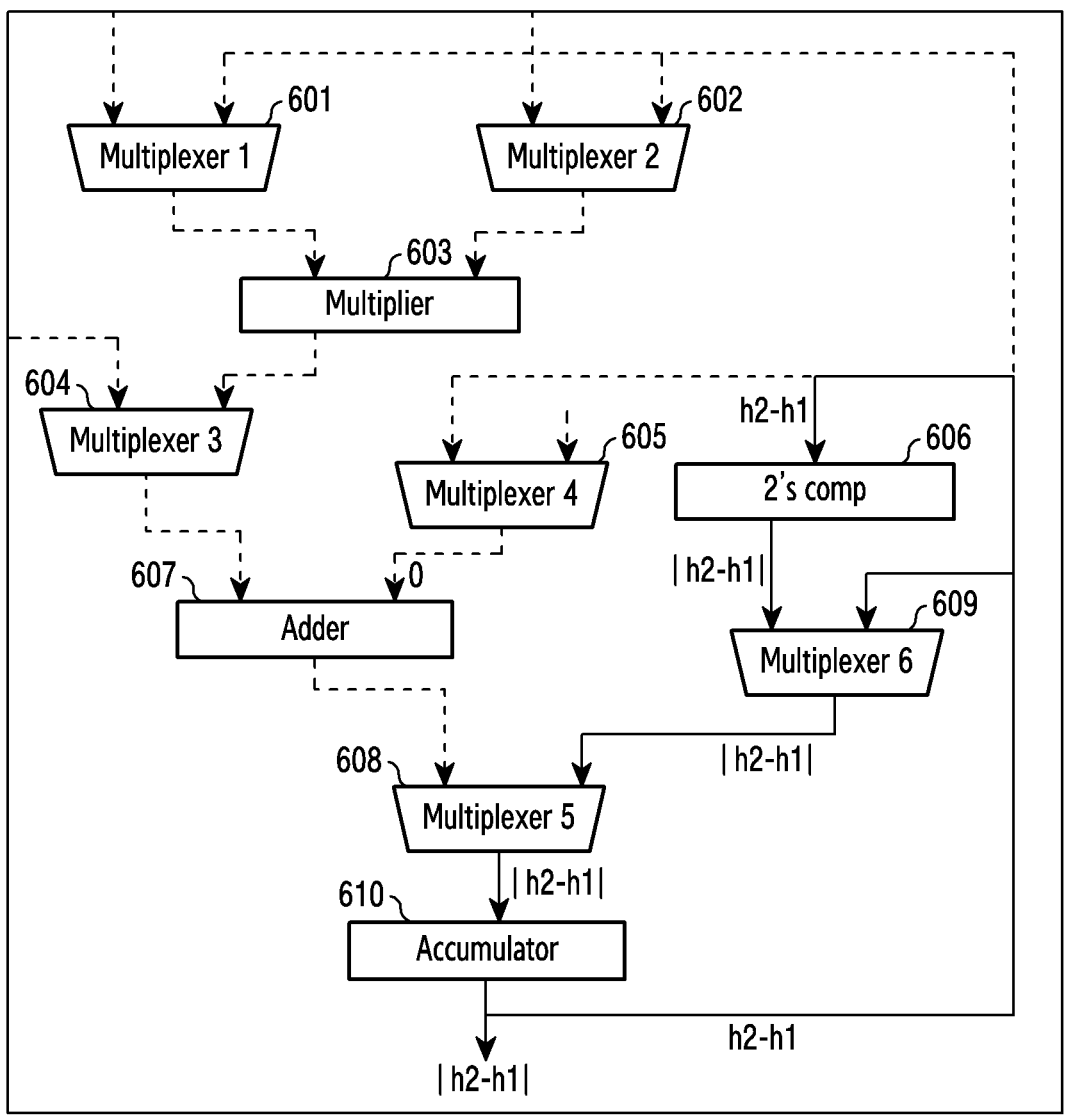
FIG. 7C is a diagram illustrating a first norm operation process for a first feature vector and a second feature vector according to an embodiment of the disclosure.

FIG. 7C is a diagram illustrating a process of calculating a first norm for a first feature vector and a second feature vector according to an embodiment of the disclosure.

Referring to FIG. 7C, in order to perform a norm operation on the first feature vector and the second feature vector, the operation circuit 312 may perform an absolute value operation on the subtraction data h2−h1. Since the description of the configuration of the operation circuit 312 is the same as that described with reference to FIG. 6, duplicate descriptions are omitted.

According to an embodiment, with reference to FIG. 7C, the subtraction data h2−h1 stored in the accumulator 610 may be input to the two's complement circuit 606. The two's complement circuit 606 according to an embodiment may perform an absolute value operation on the input subtraction data h2−h1 and output the subtraction absolute value data |h2−h1| to the sixth multiplexer 609. According to various embodiments, the two's complement circuit 606 may include various configurations necessary for calculating an absolute value.

According to an embodiment, the sixth multiplexer 609 may output subtraction absolute value data |h2−h1| to the fifth multiplexer 608. In addition, the fifth multiplexer 608 may select subtraction absolute value data |h2−h1| and output it to the accumulator 610, and the output subtraction absolute value data |h2−h1| may be stored in the accumulator 610. According to an embodiment, subtraction absolute value data |h2−h1| stored in the accumulator 610 of the operation circuit 312 may be expressed as a first norm value for calculating the similarity of the first feature vector and the second feature vector. According to an embodiment, the processor 310 described with reference to FIG. 3 may perform a sigmoid operation on a first norm value. According to an embodiment, the first norm value obtained by performing the sigmoid operation may be expressed as first similarity data. According to an embodiment, a similarity calculation operation of determining whether a custom keyword is included in the second voice signal based on the first similarity data will be described later in detail with reference to FIG. 8.

Figure 7D:
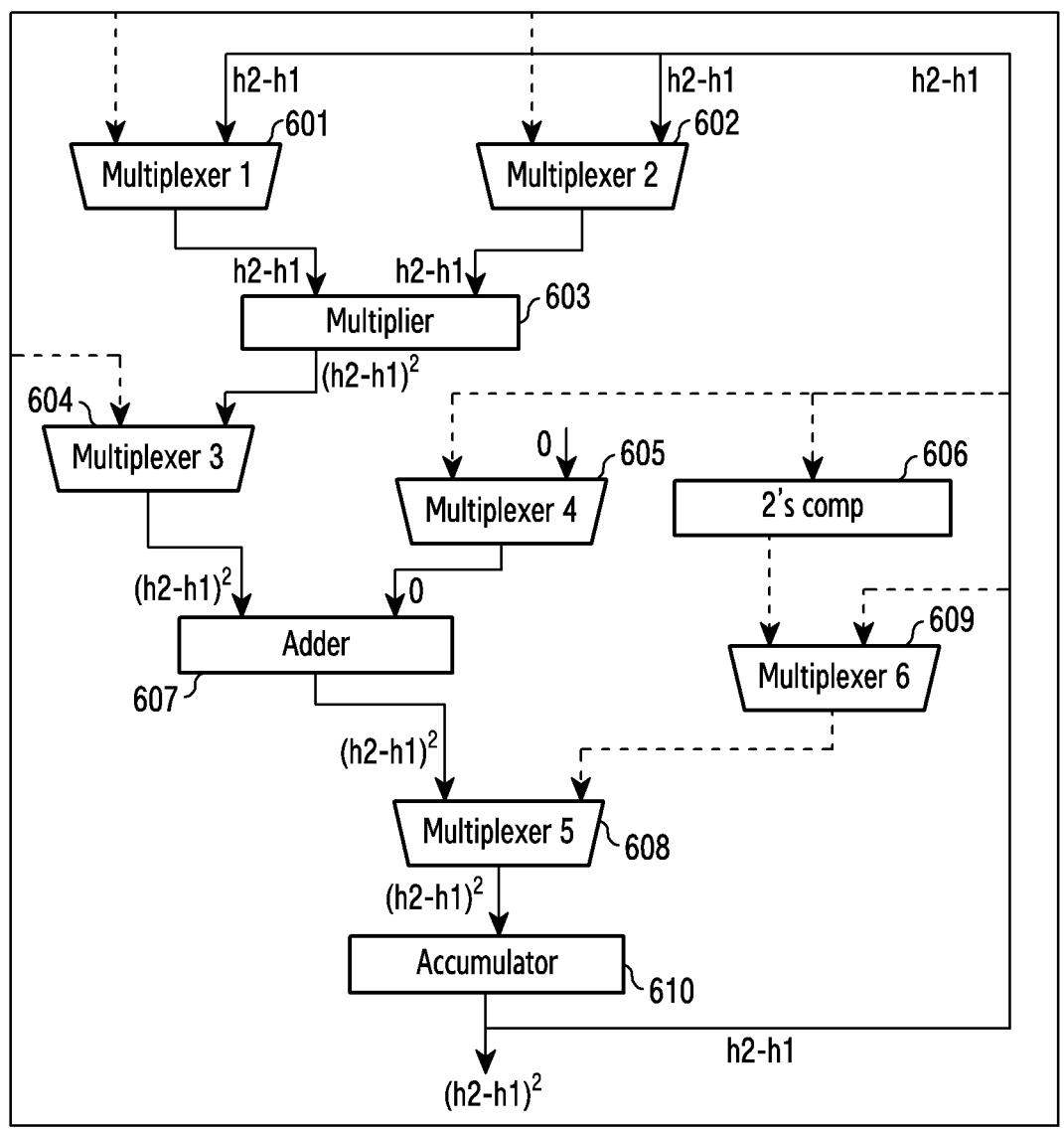
FIG. 7D is a diagram illustrating a second norm operation process for a first feature vector and a second feature vector according to an embodiment of the disclosure.

FIG. 7D is a diagram illustrating a process of calculating a second norm for a first feature vector and a second feature vector according to an embodiment of the disclosure.

Referring to FIG. 7D, in order to perform a norm operation on a first feature vector and a second feature vector, an operation circuit 312 may perform a square operation on subtraction data h2−h1. Since the description of the configuration of the operation circuit 312 is the same as that described with reference to FIG. 6, duplicate descriptions are omitted.

According to an embodiment, with reference to FIG. 7C, subtraction data h2−h1 stored in an accumulator 610 may be input to each of a first multiplexer 601 and a second multiplexer 602. The first multiplexer 601 and the second multiplexer 602 according to an embodiment may output the input subtraction data h2−h1 to the multiplier 603. The multiplier 603 according to an embodiment may perform a multiplication operation on subtraction data h2−h1 input from the first multiplexer 601 and the second multiplexer 602. The multiplier 603 according to an embodiment may perform a multiplication operation on the subtraction data h2−h1 and output the subtraction squared data $(h2-h1)^2$ as a result.

According to an embodiment, the subtraction squared data $(h2-h1)^2$ output from the multiplier 603 may be input to the third multiplexer 604. The third multiplexer 604 according to an embodiment may output the input subtraction squared data $(h2-h1)^2$ to the adder 607. According to an embodiment, the fourth multiplexer 605 may receive "0" and output "0" to the adder 607. The adder 607 according to an embodiment may perform an addition operation on subtraction square data $(h2-h1)^2$ input from the third multiplexer 604 and "0" input from the fourth multiplexer 605, and output an addition result. Accordingly, the adder 607 may output the subtraction squared data $(h2-h1)^2$ as the result of the addition.

According to an embodiment, the subtraction square data $(h2-h1)^2$ output from the adder 607 may be input to the fifth multiplexer 608, and the subtraction square data $(h2-h1)^2$ input to the fifth multiplexer 608 may be input to the accumulator 610 and stored.

According to an embodiment, the subtraction square data $(h2-h1)^2$ stored in the accumulator 610 of the operation circuit 312 may be expressed as a second norm value for calculating the similarity of the first feature vector and the second feature vector. According to an embodiment, the processor 310 described with reference to FIG. 3 may perform a sigmoid operation on a second norm value. According to an embodiment, the second norm value obtained by performing the sigmoid operation may be expressed as second similarity data. According to an embodiment, a similarity calculation operation of determining whether a custom keyword is included in the second voice signal based on the second similarity data will be described later in detail with reference to FIG. 8.

Figure 8:
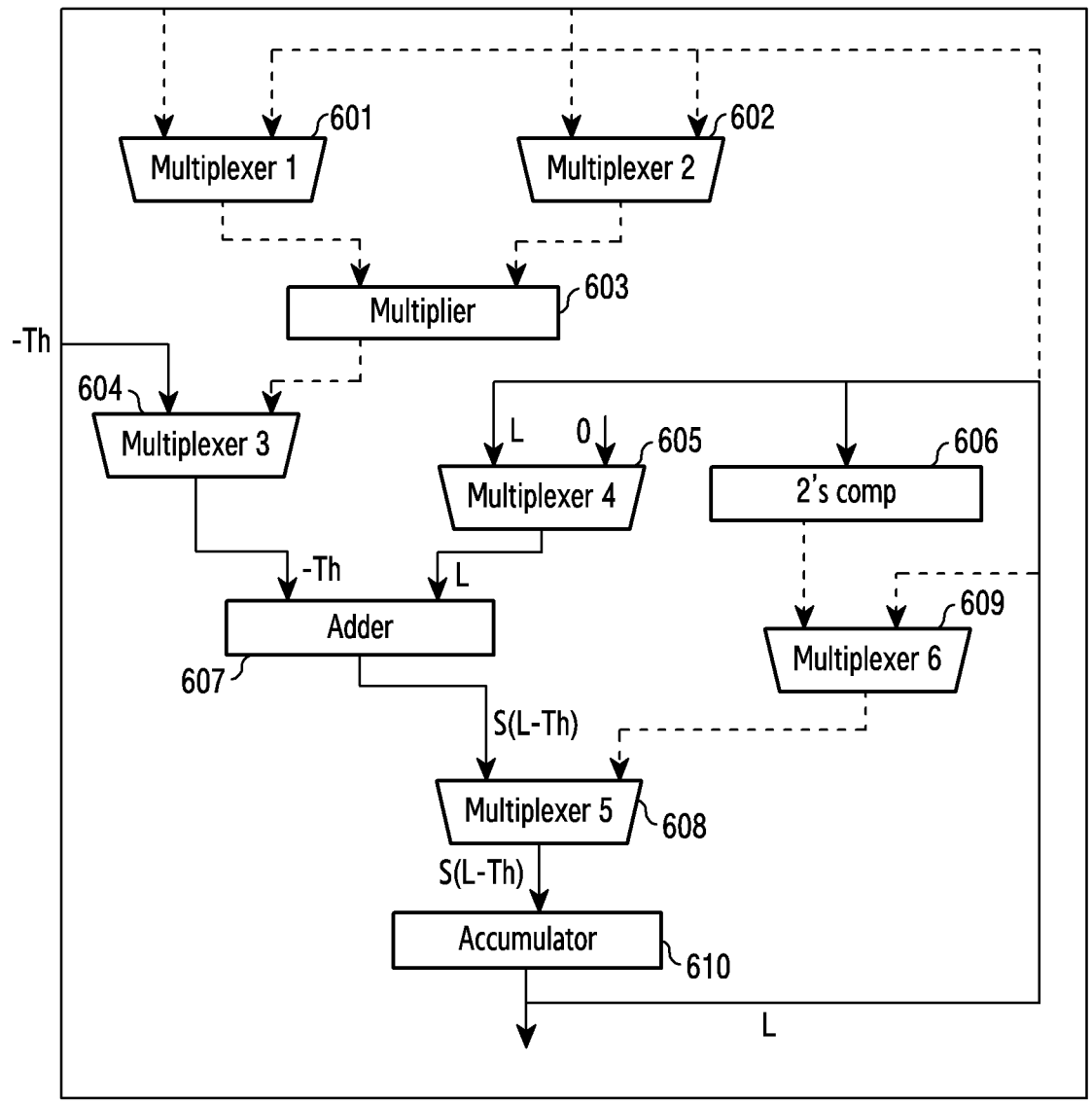
FIG. 8 is a diagram illustrating a similarity calculation process of an operation circuit according to an embodiment of the disclosure.

FIG. 8 is a diagram illustrating a similarity calculation process of an operation circuit according to an embodiment of the disclosure.

Referring to FIG. 8, a processor 310 may compare a first similarity data and a second similarity data described with reference to FIGS. 7A to 7D with data on a keyword detection sensitivity using an operation circuit 312. According to an embodiment, the accelerator controller 3130 may determine whether to execute the voice assistant application according to the comparison result, generate an interrupt signal for executing the voice assistant application, and transmit the same to the processor 310. For example, the accelerator controller 3130 included in the keyword detection accelerator 3100 may generate an interrupt signal and transmit the same to the processor 310 (e.g., a central processing unit). The processor 310 according to an embodiment may execute a voice assistant application, based on the interrupt signal.

The operation circuit 312 according to an embodiment may compare the magnitude of the first similarity data and of the similarity threshold value −Th (e.g., the similarity threshold value 3113 of FIG. 4). In addition, the operation circuit 312 may compare the magnitude of the second similarity data and the similarity threshold value −Th. According to an embodiment, an operation for comparing the magnitude of the first similarity data and the similarity threshold value −Th and an operation for comparing the magnitude of the second similarity data and the similarity threshold value −Th may be performed through the same operation process. Therefore, for convenience of description, the first similarity data and the second similarity data may be collectively referred to as similarity data L.

According to an embodiment, the accelerator controller 3130 may input the similarity threshold value −Th stored in the buffer memory 3110 to the third multiplexer 604. The third multiplexer 604 may output the input similarity threshold −Th to the adder 607.

According to an embodiment, the similarity data L stored in the accumulator 610 with reference to FIGS. 7C and 7D may be input to the third multiplexer 604. The fourth multiplexer 605 according to an embodiment may receive the similarity data L and "0", select and output the similarity data L. The output similarity data L may be input to the adder 607.

According to an embodiment, the adder 607 may perform an addition operation on the similarity threshold value −Th output through the third multiplexer 604 and input to the adder and the similarity data L input to the adder 607 through the fourth multiplexer 605. According to an embodiment, the adder 607 may identify a similarity threshold value −Th and a sign bit of an addition result of the similarity data L. For example, the adder 607 may identify the most significant bit of the similarity comparison value L−Th, which is a result of adding the similarity threshold value −Th and the similarity data L, as a sign bit.

According to an embodiment, the adder 607 may output a sign bit of the determined similarity comparison value L−Th as a similarity result S(L−Th). According to an embodiment, the output similarity result S(L−Th) may be input to the fifth multiplexer 608. According to an embodiment, the fifth multiplexer 608 may output the input similarity result S(L−Th) to the accumulator 610. The accumulator 610 according to an embodiment may store the similarity result S(L−Th) output from the fifth multiplexer 608.

According to an embodiment, the accelerator controller 3130 may generate an interrupt signal to execute the voice assistant application when the similarity result S(L−Th) obtained from the operation circuit 312 indicates a positive number. For example, when a custom keyword for executing the voice assistant application is included in the second voice signal obtained by streaming from the user, the obtained similarity result S(L-Th) may represent a positive number. Accordingly, the accelerator controller 3130 may generate an interrupt signal for executing the voice assistant application and transmit the same to the processor 310. For example, the accelerator controller 3130 included in the keyword detection accelerator 3100 may generate an interrupt signal and transmit the same to the processor 310 (e.g., a central processing unit). The processor 310 according to an embodiment may execute the voice assistant application, based on the interrupt signal.

According to another embodiment, if the similarity result S(L-Th) obtained from the operation circuit 312 indicates a negative number, it may be determined not to execute the voice assistant application. For example, when the second voice signal obtained by streaming from the user does not include a custom keyword for executing the voice assistant application, the obtained similarity result S(L-Th) may represent a negative number. Accordingly, the accelerator controller 3130 might not execute the voice assistant application, and may re-obtain the second voice signal through the microphone 330 through streaming.

Figure 9:
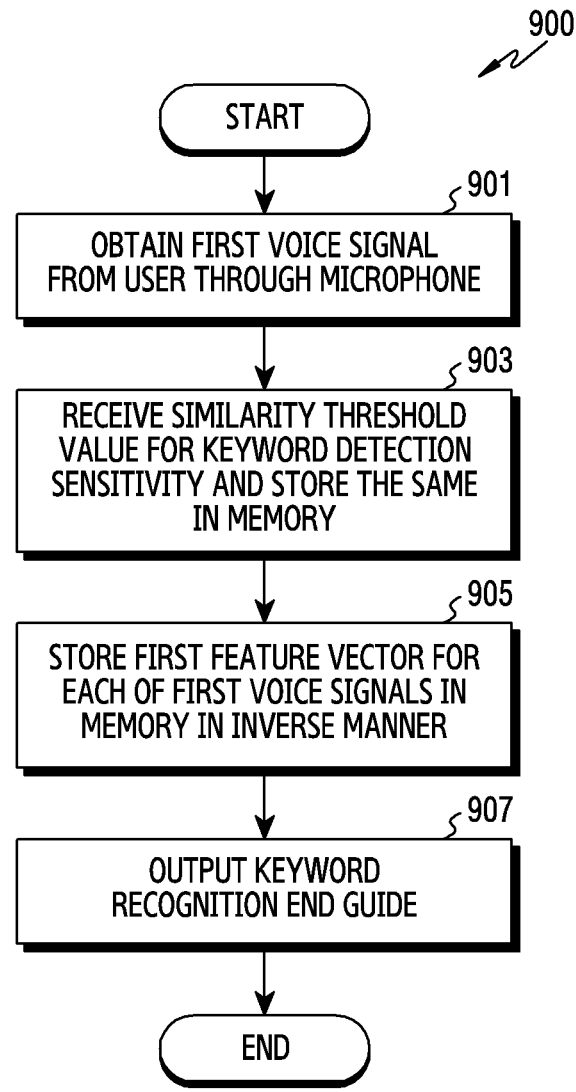
FIG. 9 is a flowchart illustrating an operation of storing a custom keyword of an electronic device according to an embodiment of the disclosure.

FIG. 9 is a flowchart illustrating an operation of storing a custom keyword by an electronic device according to an embodiment of the disclosure.

Referring to FIG. 9, depicting a flowchart 900, in operation 901, a processor 310 may obtain a first voice signal from a user of an electronic device 300 using a microphone 330. According to an embodiment, the first voice signal is a voice command for executing the voice assistant application, and may include a custom keyword set by a user's input.

According to an embodiment, in operation 903, the electronic device 300 may receive an input for keyword detection sensitivity from a user and store the received similarity threshold value in the memory 320. According to an embodiment, when storing the similarity threshold value in the memory 320, the processor 310 may store the similarity threshold value in the memory 320 as an inverse value of the similarity threshold value.

According to an embodiment, in operation 905, the processor 310 may store the first feature vector for the obtained first voice signal in the memory 320 as an inverse value. According to an embodiment, the first voice signal may include a voice signal included in at least one utterance of the user. The processor 310 according to an embodiment may obtain the first feature vector for each of the first voice signals included in at least one utterance through neural network operation. For example, the first feature vector for each of the first voice signals may be obtained using a convolutional layer included in the neural network.

According to various embodiments, the processor 310 may store the first feature vector for each of the first voice signals in the memory 320 in an inverse manner, or may process (e.g., averaging) the representative value of the first feature vector for each of the first voice signals and store the calculated value in the memory 320 in an inverse manner. An operation of storing the inverse value of the first feature vector in the memory 320 by the processor 310 according to an embodiment will be described later in detail with reference to FIG. 10.

According to an embodiment, in operation 907, the processor 310 may output a keyword recognition end guide indicating that the keyword recognition has been completed. For example, the processor 310 may control the display 350 to output the recognition end guide.

Figure 10:
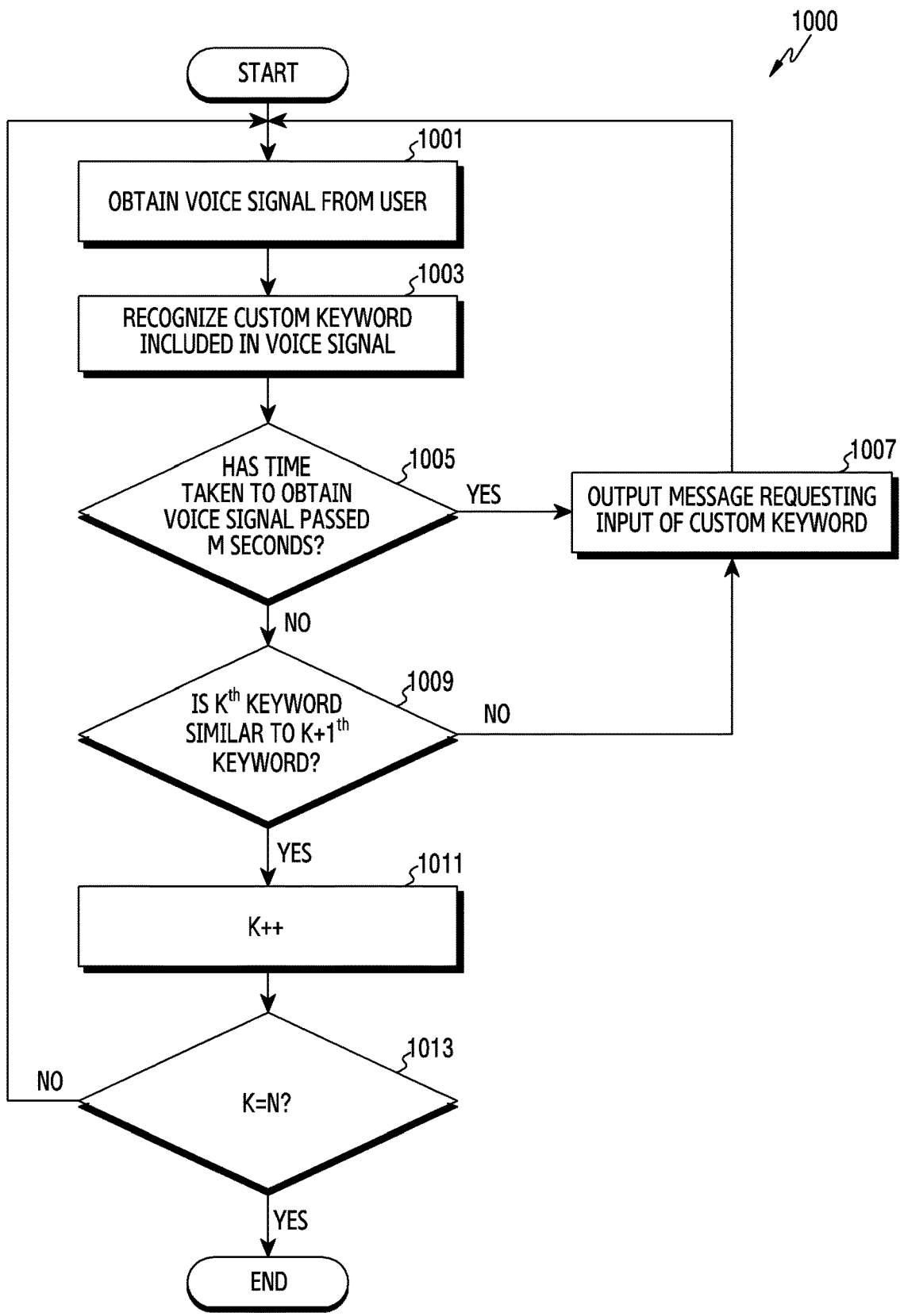
FIG. 10 is a flowchart illustrating an operation of configuring a custom keyword of an electronic device according to an embodiment of the disclosure.

FIG. 10 is a flowchart illustrating an operation of configuring a custom keyword by an electronic device according to an embodiment of the disclosure.

Referring to FIG. 10, depicting a flowchart 1000, in operation 1001, a processor 310 may obtain a voice signal from the user of an electronic device 300 through a microphone 330. According to an embodiment, in operation 1003, the processor 310 may recognize a custom keyword included in a voice signal. According to an embodiment, the custom keyword may represent a keyword that the user sets as a command for executing the voice assistant application.

According to an embodiment, in operation 1005, the processor 310 may determine whether a time taken to obtain a voice signal from the user is less than M seconds. That is, the processor 310 may determine whether the length of the user utterance is obtained within a predetermined time. According to an embodiment, if the length of the voice signal is within M seconds, the processor 310 may determine the similarity between the $K^{th}$ custom keyword included in the voice signal and the $K+1^{th}$ custom keyword included in the voice signal in operation 1009. According to an embodiment, the operation of determining the similarity between the $K^{th}$ custom keyword and the $K+1^{th}$ custom keyword may be similar to the operation of determining the similarity of the first feature vector corresponding to the first voice signal and the second feature vector corresponding to the second voice signal described with reference to FIGS. 7A to 7D, and 8. That is, the processor 310 may determine whether the $K^{th}$ keyword and the $K+1^{th}$ keyword are similar through an operation of determining the similarity of the feature vector corresponding to the $K^{th}$ custom keyword and the feature vector corresponding to the $K+1^{th}$ custom keyword included in the voice signal. According to various embodiments, a keyword configuring sensitivity for configuring a custom keyword may be different from a keyword detection sensitivity. That is, the processor 310 may perform an operation similar to receiving data on the keyword detection sensitivity from the user, and receive data on the keyword configuring sensitivity from the user. The processor 310 according to an embodiment may determine whether the $K^{th}$ keyword and the $K+1^{th}$ keyword are similar to each other based on a keyword detection sensitivity or a threshold value based on a keyword configuring sensitivity.

According to an embodiment, in operation 1011, the processor 310 may increase the value of K by 1 in response to the similarity between the $K^{th}$ keyword and the $K+1^{th}$ keyword.

According to an embodiment, the processor 310 may output a message requesting input of a custom keyword in operation 1007 when it is determined that the time taken to obtain the voice signal is M seconds or more, or it is determined that the $K^{th}$ keyword and the $K+1^{th}$ keyword are not similar. For example, the processor 310 may control the display 350 to output a message requesting input of a custom keyword. According to an embodiment, the processor 310 may perform again from operation 1001 upon requesting input of a custom keyword.

According to an embodiment, the processor 310 may compare the value of K with N in operation 1013. According to an embodiment, N may indicate the number of repetitions for configuring a preset custom keyword. For example, N may indicate the number of times a custom keyword must be input to provide an always-on voice assistant service using a custom keyword. According to an embodiment, when the K value and the N value are the same, the processor 310 may terminate the custom keyword configuring operation. If the K value and the N value are not the same, the processor 310 may obtain a voice signal from the user again in operation 1001.

According to an embodiment, in order to perform the custom keyword configuring operation, the processor 310 may configure the K value as 1 and perform operations 1001 to 1013. According to an embodiment, the processor 310 may perform operations 1001 to 1013 to perform a neural network operation on the configured custom keyword to extract the first feature vector, and store an inverse value of the first feature vector in the memory 320.

Figure 11:
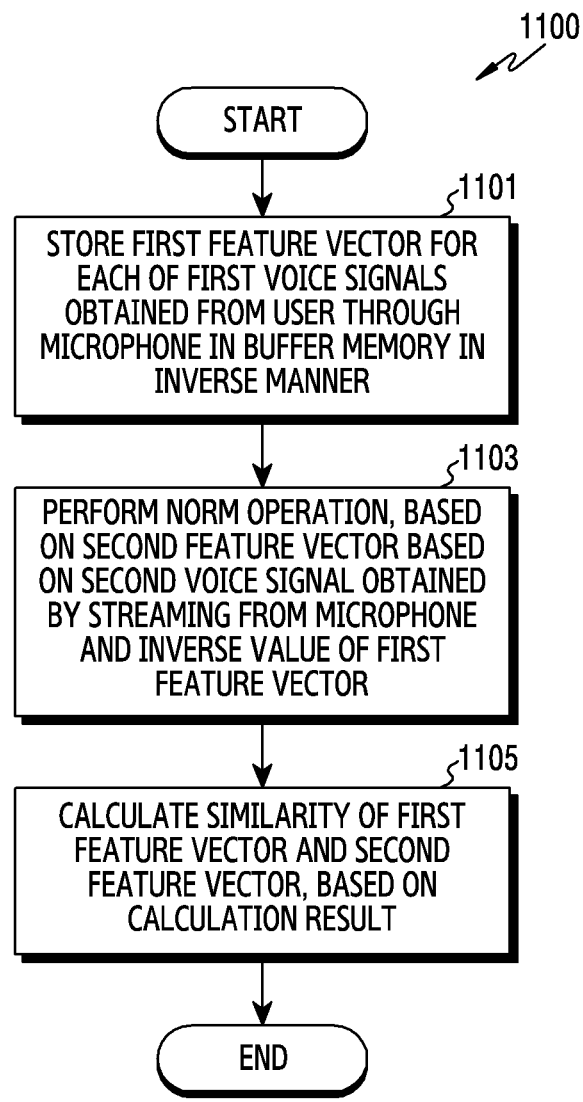
FIG. 11 is a flowchart illustrating a keyword similarity calculation operation of an electronic device according to an embodiment of the disclosure.

FIG. 11 is a flowchart illustrating a keyword similarity calculation operation of an electronic device according to an embodiment of the disclosure.

Referring to FIG. 11, depicting a flowchart 1100, in operation 1101, a processor 310 may store a first feature vector for each of first voice signals obtained from a user through a microphone 330 in a buffer memory 311 in an inverse manner. For another example, the processor 310 may load the inverse value of the first feature vector stored in the memory 320 into the buffer memory 311.

According to an embodiment, in operation 1103, the processor 310 may perform a norm operation, based on the second feature vector based on the second voice signal obtained from the microphone 330 and the inverse value of the first feature vector. For example, the processor 310 may perform a norm operation of the inverse value of the first feature vector and the second feature vector using the operation circuit 312. The norm operation process according to an embodiment may be performed through an operation similar to the operation described above with reference to FIGS. 7A to 7D. According to an embodiment, the processor 310 may obtain the first similarity data and the second similarity data described with reference to FIGS. 7A to 7D through the norm operation using the operation circuit 312.

According to an embodiment, in operation 1105, the processor 310 may perform a similarity calculation between the first feature vector and the second feature vector, based on a result of the norm operation. According to an embodiment, the processor 310 may compare the first similarity data and the second similarity data obtained through the operation circuit 312 with data on the keyword detection sensitivity, respectively, and determine whether to execute the voice assistant application according to the comparison result. The calculation of the similarity between the first feature vector and the second feature vector according to an embodiment may be performed through the operation of the operation circuit 312 described above with reference to FIG. 8.

Figure 12:
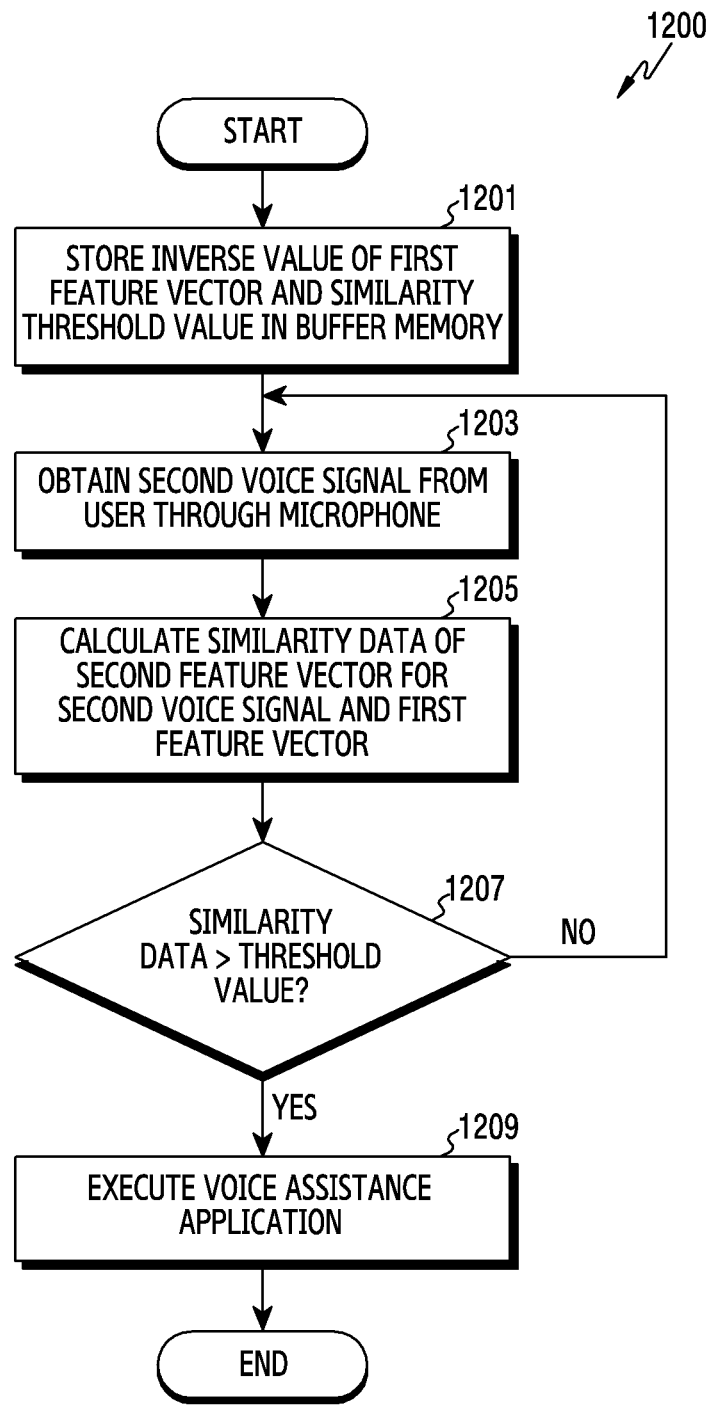
FIG. 12 is a flowchart illustrating an operation of executing a voice assistant application of an electronic device according to an embodiment of the disclosure.

FIG. 12 is a flowchart illustrating an operation of executing a voice assistant application of an electronic device, according to an embodiment of the disclosure.

Referring to FIG. 12, depicting a flowchart 1200, a processor 310 may store an inverse value of a first feature vector and a similarity threshold value in a buffer memory 311 in order to perform the always-on custom keyword detection operation in operation 1201. According to an embodiment, the processor 310 may load the inverse value of the first feature vector stored in the memory 320 and a similarity threshold value into the buffer memory 311.

According to an embodiment, the processor 310 may obtain a second voice signal from the user through the microphone 330 in operation 1203. According to an embodiment, the second voice signal obtained through the microphone 330 may represent a voice signal obtained through streaming According to an embodiment, in operation 1205, the processor 310 may perform a similarity calculation between the second feature vector and the first feature vector for the second voice signal. For example, the processor 310 may perform a similarity data operation between the inverse value of the first feature vector stored in the buffer memory 311 and the second feature vector obtained through streaming through the operation circuit 312. The operation of calculating the similarity data of the operation circuit 312 according to an embodiment may be performed through the operation process described with reference to FIGS. 7A to 7D.

According to an embodiment, in operation 1207, the processor 310 may compare the similarity data and the similarity threshold value for the keyword detection sensitivity. For example, the processor 310 may compare the similarity data and the similarity threshold value through the operation circuit 312. The similarity data according to an embodiment may represent data obtained by performing a sigmoid operation on the similarity data obtained in operation 1205.

According to an embodiment, when the similarity data is greater than the similarity threshold value, the processor 310 may execute the voice assistant application in operation 1209. For example, when the similarity data is greater than the similarity threshold, the processor 310 may generate an interrupt signal for executing the voice assistant application and transmit the generated interrupt signal to the central processing unit (CPU) to execute the voice assistant application. According to an embodiment, when the similarity data is less than the similarity threshold value, the processor 310 may obtain the second voice signal through streaming through the microphone 330 in operation 1203.

According to an embodiment, the processor 310 may perform an operation for executing the voice assistant application, based on the custom keyword by calculating the similarity between a preconfigured custom keyword for executing the voice assistant application and the second voice signal obtained through streaming through operations 1201 to 1209. For example, when the custom keyword configured based on the first voice signal is "Galaxy", the processor 310 may calculate a first feature vector corresponding to "Galaxy" and store the inverse value of the first feature vector in the memory 320. Thereafter, when a second voice signal of "Galaxy" is obtained by streaming from the user, the processor 310 may calculate a second feature vector corresponding to "Galaxy" and perform a similarity calculation between the inverse value of the first feature vector and the second feature vector. The processor 310 according to an embodiment may execute the voice assistant application, based on the similarity calculation result.

Some of the operations in the flowchart described with reference to FIGS. 9 to 12 may be omitted, and are not necessarily executed in order. In addition, some of the operations described with reference to FIGS. 9 to 12 may be included in the flowchart described with reference to other drawings and performed.

Figure 13:
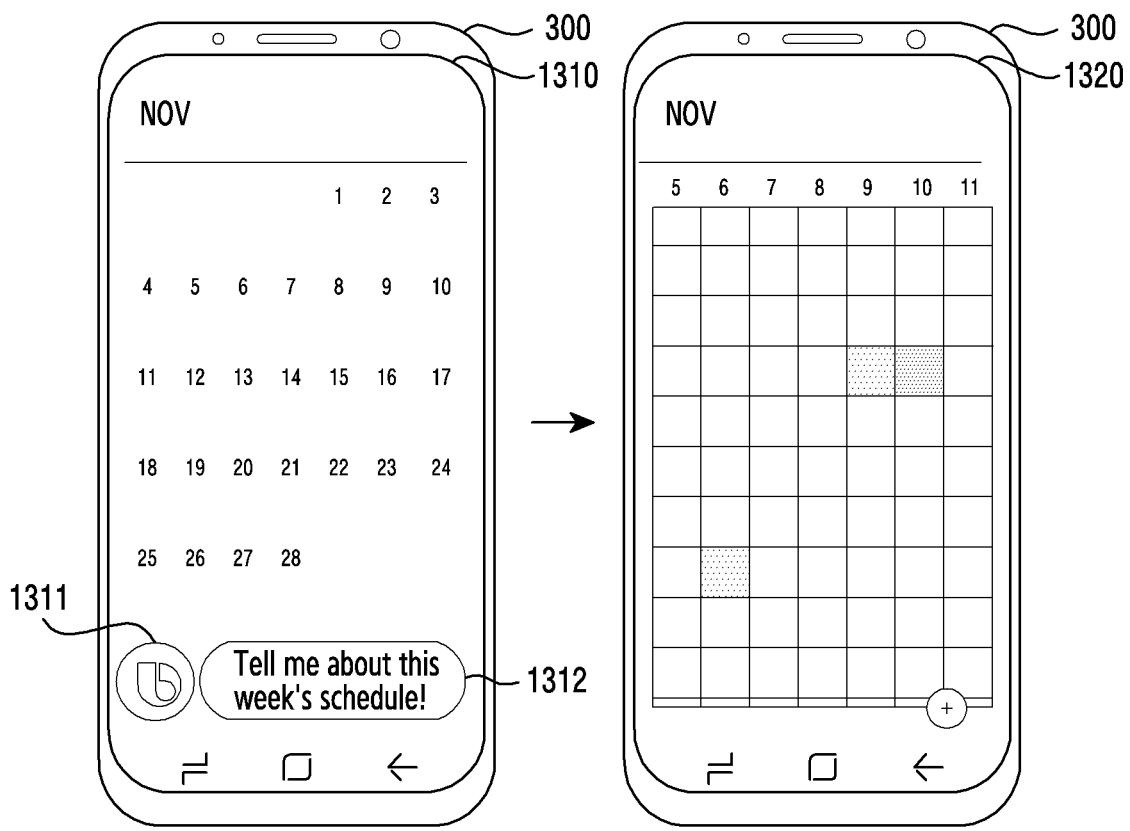
FIG. 13 is a diagram illustrating an electronic device displaying a screen for processing a voice input received through an intelligent application according to an embodiment of the disclosure.

FIG. 13 is a diagram illustrating an electronic device displaying a screen for processing a voice input received through an intelligent application according to an embodiment of the disclosure.

FIG. 13 is a diagram illustrating a screen in which an electronic device processes a voice input received through an intelligent application according to various embodiments.

The electronic device 300 (e.g., the user terminal 100 of FIG. 1) may execute an intelligent application to process a user input through the intelligent server 200.

Referring to FIG. 13, on a first screen 1310, when the electronic device 300 recognizes a designated voice input (e.g., wake-up!) or receives an input through a hardware key (e.g., a dedicated hardware key), the electronic device 300 may execute an intelligent application for processing the voice input. The electronic device 300, for example, may execute the intelligent application while executing the schedule application. According to an embodiment, the electronic device 300 may include a display (not illustrated). The electronic device 300 may display an object (e.g., an icon) 1311 corresponding to an intelligent application on a display (e.g., the display 140 of FIG. 1). According to an embodiment, the electronic device 300 may receive a voice input by a user utterance. For example, the electronic device 300 may receive a voice input "Tell me about this week's schedule!". According to an embodiment, the electronic device 300 may display a user interface (UI) 1312 (e.g., an input window) of an intelligent application in which text data of a received voice input is displayed on the display.

According to an embodiment, on a second screen 1320, the electronic device 300 may display a result corresponding to the received voice input on the display. For example, the electronic device 300 may receive a plan corresponding to the received user input, and display "this week schedule" on the display according to the plan.

Figure 14:
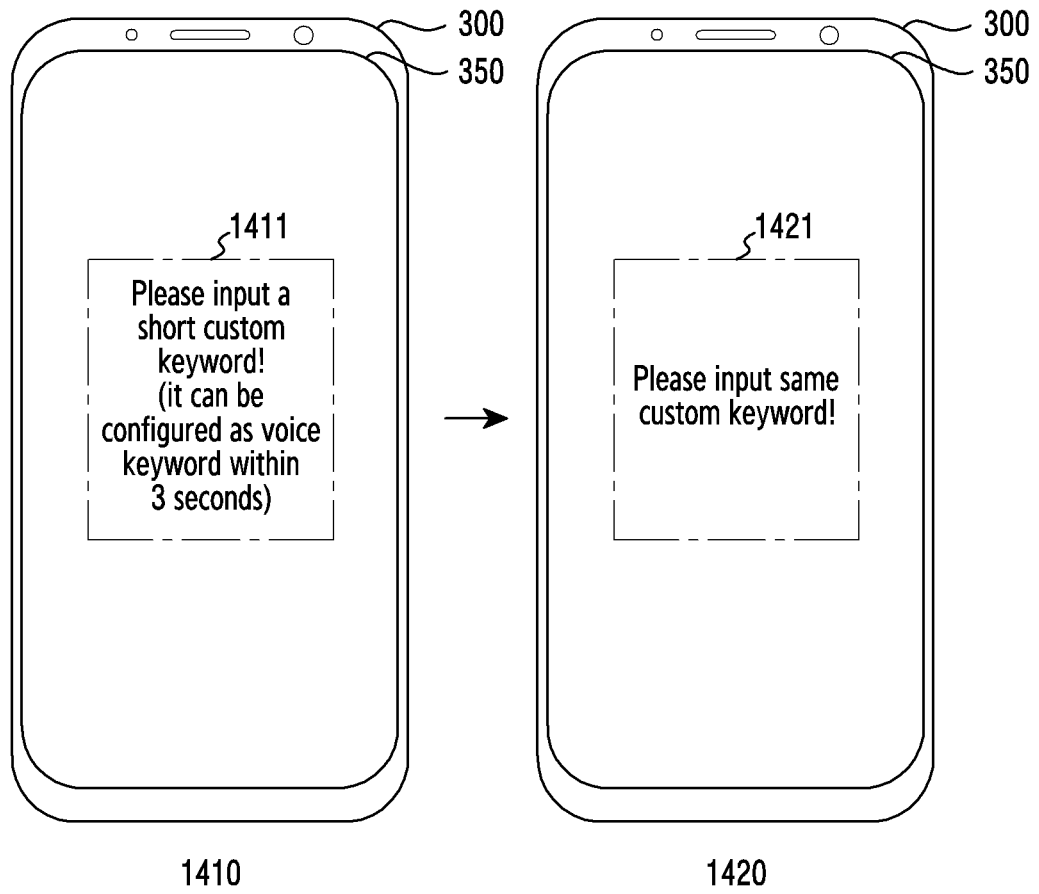
FIG. 14 is a diagram illustrating an electronic device displaying a screen for configuring a custom keyword according to an embodiment of the disclosure.

FIG. 14 is a diagram illustrating an electronic device that displays a screen for configuring a custom keyword, according to an embodiment of the disclosure.

FIG. 14 is a diagram illustrating a screen for configuring the custom keyword by an electronic device according to various embodiments.

The electronic device 300 (e.g., the user terminal 100 of FIG. 1) may obtain a first voice signal configured to execute the voice assistant application from the user through the microphone 330 and configure the same as a custom keyword. According to an embodiment, the electronic device 300 may execute the voice assistant application, based on the input of a keyword similar to the custom keyword through the microphone 330.

Referring to FIG. 14, when the time taken to obtain a first voice signal through a microphone 330 exceeds a configured time (e.g., 2 seconds), a processor 310 may output a first guide message 1411 on a first screen 1410. That is, when the time taken to obtain the first voice signal exceeds a set time, the processor 310 may output a guide message of "Please input a short custom keyword (it can be configured as a voice keyword within 2 seconds)" through the display 350.

According to an embodiment, in order to perform the custom keyword configuring operation, the processor 310 may receive at least one user utterance through the microphone 330 and obtain a first voice signal corresponding to the at least one user utterance. For example, the processor 310 may receive a user utterance by repeating a configured number of times (e.g., N times). The processor 310 may determine whether the custom keyword included in the obtained voice signal is a similar custom keyword. For example, the processor 310 may determine a similarity between the $K^{th}$ custom keyword included in the $K^{th}$ voice signal and the $K+1^{th}$ custom keyword included in the $K+1^{th}$ voice signal. The similarity determination operation according to an embodiment may include the operation described with reference to FIG. 10.

According to an embodiment, when the obtained custom keywords are not similar to each other, the processor 310 may output a second guide message 1421 on the second screen 1420. That is, when the custom keyword included in at least one user utterance input while acquiring the first voice signal is not similar, the processor 310 may output a guide message of "Please input the same custom keyword" through the display 350.

Figure 15:
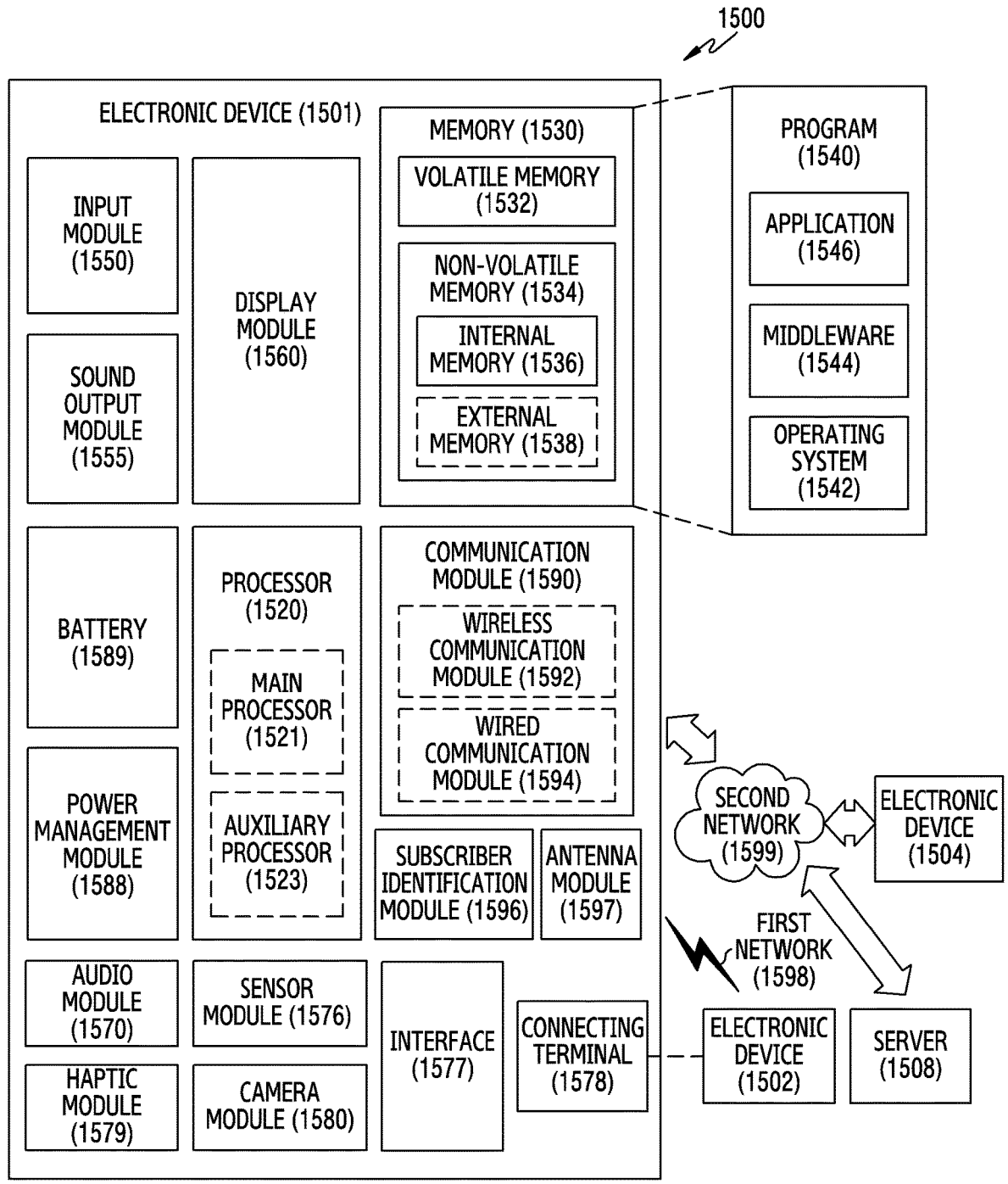
FIG. 15 is a block diagram illustrating an electronic device in a network environment according to an embodiment of the disclosure.

FIG. 15 is a block diagram illustrating an electronic device in a network environment according to an embodiment of the disclosure.

Referring to FIG. 15, an electronic device 1501 in a network environment 1500 may communicate with an electronic device 1502 via a first network 1598 (e.g., a short-range wireless communication network), or at least one of an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the 1515 connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560). 1515

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the millimeter (mm) Wave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 or 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smailphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (e.g., the electronic device 300 of FIG. 3) according to an embodiment may include a microphone (e.g., the microphone 330 of FIG. 3) and at least one processor (e.g., the processor 310 of FIG. 3) operatively connected to the microphone, wherein the at least one processor may include a buffer memory (e.g., the buffer memory 311 of FIG. 3) for storing a first feature vector for a first voice signal obtained from the microphone as an inverse value, and may include an operation circuit (e.g., the operation circuit 312 of FIG. 3) configured to perform a norm operation for the first feature vector and the second feature vector, based on a second feature vector based on a second voice signal streamed from the microphone and an inverse value of the first feature vector stored in the buffer memory or calculate a similarity between the first feature vector and the second feature vector.

According to an embodiment, the at least one processor is configured to input the first voice signal into a convolution layer to obtain the first feature vector, and input the second voice signal into the convolution layer to obtain the second feature vector.

According to an embodiment, the operation circuit may include at least one multiplexer configured to selectively select and output one of external data input from the buffer memory and data input from a configuration included in the operation circuit, at least one accumulator configured to accumulate the output of the at least one multiplexer, an adder configured to perform an addition operation based on an output value of the at least one multiplexer, and a multiplier configured to perform a multiplication operation based on an output value of the at least one multiplexer.

In an embodiment, the operation circuit may include a two's complement circuit configured to perform a two's complement operation based on the output value of the accumulator.

According to an embodiment, the at least one multiplexer may include a first multiplexer configured to receive a second feature vector from the buffer memory, a second multiplexer configured to receive a value of 1 from the outside of the operation circuit, and a third multiplexer configured to receive an inverse value of the first feature vector from the buffer memory.

According to an embodiment, the at least one processor may receive an input for the similarity from the user of the electronic device, and store an inverse value of the similarity as a similarity threshold value in the buffer memory.

According to an embodiment, the at least one processor may determine whether to execute the voice assistant application through performing a comparison operation on the result data of the norm operation and based on a similarity threshold through the operation circuit, and based on a comparison result output from the operation circuit.

According to an embodiment, the at least one processor may obtain subtraction absolute value data by calculating a difference between the inverse value of the first feature vector and the second feature vector through the operation circuit, obtain first similarity data by performing a sigmoid operation on the subtraction absolute value data, and perform a comparison operation on the first similarity data and the similarity threshold.

According to an embodiment, the at least one processor may obtain subtraction squared data by calculating the square of the difference between the inverse value of the first feature vector and the second feature vector through the operation circuit, obtain second similarity data by performing a sigmoid operation on the subtraction squared data, and perform a comparison operation on the second similarity data and the similarity threshold value.

According to an embodiment, the at least one processor generates an interrupt signal to run the voice assistant application, and transmits the generated interrupt signal to the central processing unit (CPU).

According to an embodiment, the at least one processor may obtain at least one user utterance through the microphone, obtain the first feature vector for the first voice signal included in the at least one user utterance, and calculate the similarity of the first feature vector corresponding to the at least one user utterance through the operation circuit.

According to an embodiment, the at least one processor may obtain the first feature vector by calculating a feature vector for a first voice signal corresponding to the at least one user utterance as one representative value.

In one embodiment, a communication circuit configured to transmit and receive data to an external server may be further included, and the at least one processor may transmit and receive the first voice signal and the second voice signal to and from the intelligent server through the communication circuit.

According to an embodiment, the electronic device 300 may further include a display, and the at least one processor may control the display to display a guide for inputting a custom keyword for executing a voice assistant app.

As described above, according to an embodiment, an operation method of an electronic device including an operation circuit configured to perform a norm operation and a similarity calculation may include inversely storing a first feature vector for a first voice signal obtained from a user of the electronic device through a microphone included in the electronic device in a memory included in the electronic device, performing a norm operation, based on a second feature vector based on a second speech signal obtained by streaming from the microphone and an inverse value of the first vector, and calculating a similarity between the first feature vector and the second feature vector, based on the calculation result.

The method of operating an electronic device according to an embodiment may further include executing a voice assistant application, based on a result of the similarity calculation.

According to an embodiment, the operation of performing the norm operation may include obtaining subtraction absolute value data or subtraction square data by calculating a difference between the inverse value of the first feature vector and the second feature vector through the operation circuit and acquiring similarity data by performing a sigmoid operation on the subtraction absolute value data.

According to an embodiment, the operation method may further include receiving an input on the similarity from a user of the electronic device, and storing an inverse value of the similarity in a memory as a similarity threshold value, and the operation of calculating the similarity may include performing a comparison operation on the similarity data and the similarity threshold value through the operation circuit and determining whether to execute the voice assistant application, based on the operation result.

According to an embodiment, the operation circuit may include at least one multiplexer that selectively selects and outputs one of external data input from a buffer memory included in an electronic device and data input from a configuration included in the operation circuit, at least one accumulator for accumulating the output of the at least one multiplexer, an adder for performing an addition operation, based on an output value of the at least one multiplexer, a multiplier for performing a multiplication operation, based on an output value of the at least one multiplexer, and a two's complement circuit for performing a two's complement operation, based on the output value of the accumulator.

As described above, according to an embodiment, the keyword detection accelerator (e.g., the keyword detection accelerator 3100 in FIG. 4) for performing a neural network operation may include an audio signal processor (e.g., the MFCC 530 in FIG. 5), a buffer memory (e.g., the buffer memory 3110 in FIG. 4), an operation circuit (e.g., the operation circuit 3120 of FIG. 4) capable of performing a norm operation, and at least one processor (e.g., the accelerator controller 3130 of FIG. 4) operatively connected to the audio signal processor, the buffer memory, and the operation circuit. The at least one processor may store a first feature vector of the first voice signal obtained through the audio signal processor as an inverse value in the buffer memory, obtain a second voice signal streamed through the audio signal processor, and perform a norm operation on the first feature vector and the second feature vector, based on a second feature vector for the second voice signal and an inverse value of the first feature vector through the operation circuit, or calculate the similarity between the first feature vector and the second feature vector.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a microphone; and
   at least one processor operatively connected to the microphone,
   wherein the at least one processor comprises:
      a buffer memory configured to store a first feature vector for a first voice signal obtained from the microphone as an inverse value, and
      an operation circuit configured to:
         perform a norm operation for the first feature vector and a second feature vector, based on a second voice signal streamed from the microphone and the inverse value of the first feature vector stored in the buffer memory, wherein the norm operation comprises at least one of an operation of calculating an absolute value of a sum of the inverse value of the first feature vector and the second feature vector, or an operation of calculating a square value of the sum of the inverse value of the first feature vector and the second feature vector, and calculate a similarity between the first feature vector and the second feature vector, by using a result of the norm operation.

2. The electronic device of claim 1, wherein the at least one processor is configured to:
input the first voice signal into a convolution layer to obtain the first feature vector, and
input the second voice signal into the convolution layer to obtain the second feature vector.

3. The electronic device of claim 1, wherein the operation circuit comprises:
at least one multiplexer configured to selectively select and output one of external data input from the buffer memory and data input from a configuration included in the operation circuit;
at least one accumulator configured to accumulate the output of the at least one multiplexer;
an adder configured to perform an addition operation based on an output value of the at least one multiplexer; and
a multiplier configured to perform a multiplication operation based on an output value of the at least one multiplexer.

4. The electronic device of claim 3, wherein the operation circuit further comprises a two's complement circuit configured to perform a two's complement operation based on the output value of the accumulator.

5. The electronic device of claim 3, wherein the at least one multiplexer comprises:
a first multiplexer configured to receive a second feature vector from the buffer memory;
a second multiplexer configured to receive a value of 1 from outside of the operation circuit; and
a third multiplexer configured to receive the inverse value of the first feature vector from the buffer memory.

6. The electronic device of claim 1, wherein the at least one processor is configured to receive an input for a similarity from a user of the electronic device and store an inverse value for the similarity from a user of the electronic device as a similarity threshold value in the buffer memory.

7. The electronic device of claim 6, wherein the at least one processor is further configured to:
perform a comparison operation on the similarity between the first feature vector and the second feature vector calculated by using the result of the norm operation and the similarity threshold value through the operation circuit, and
determine whether to execute a voice assistant application, based on a result of the comparison operation output from the operation circuit.

8. The electronic device of claim 6, wherein the at least one processor is further configured to:
obtain first similarity data by performing a sigmoid operation on the absolute value of the sum of the inverse value of the first feature vector and the second feature vector, through the operation circuit, and
perform a comparison operation on the first similarity data and the similarity threshold value.

9. The electronic device of claim 6, wherein the at least one processor is further configured to:
obtain second similarity data by performing a sigmoid operation on squared data of the sum of the inverse value of the first feature vector and the second feature vector, through the operation circuit, and
perform a comparison operation on the second similarity data and the similarity threshold value.

10. The electronic device of claim 1, wherein the at least one processor is configured to:
generate an interrupt signal to run a voice assistant application, and
transmit the generated interrupt signal to a central processing unit (CPU).

11. The electronic device of claim 1, wherein the at least one processor is configured to:
obtain at least one user utterance through the microphone,
obtain the first feature vector for the first voice signal included in the at least one user utterance, and
calculate the similarity of the first feature vector and the second feature vector, based on the first feature vector corresponding to the at least one user utterance through the operation circuit.

12. The electronic device of claim 11, wherein the at least one processor is further configured to obtain the first feature vector by calculating a feature vector for a first voice signal corresponding to the at least one user utterance as one representative value.

13. The electronic device of claim 1, further comprising a communication circuit configured to transmit and receive data to and from an external server,
wherein the at least one processor is configured to transmit and receive the first voice signal and the second voice signal to and from an intelligent server through the communication circuit.

14. The electronic device of claim 1, further comprising a display, wherein the at least one processor is configured to control the display to display a guide for inputting a custom keyword for executing a voice assistant application.

15. An operation method of an electronic device including an operation circuit configured to perform a norm operation and a similarity calculation, the operation method comprising:
inversely storing a first feature vector for a first voice signal obtained from a user of the electronic device through a microphone included in the electronic device in a memory included in the electronic device;
performing the norm operation, based on a second feature vector based on a second voice signal obtained by streaming from the microphone and an inverse value of the first feature vector, wherein the norm operation comprises at least one of an operation of calculating an absolute value of a sum of the inverse value of the first feature vector and the second feature vector, or an operation of calculating a square value of the sum of the inverse value of the first feature vector and the second feature vector; and
calculating a similarity between the first feature vector and the second feature vector, based on a result of the norm operation.

16. The operation method of claim 15, further comprising executing a voice assistance application, based on a calculation result of the similarity.

17. The operation method of claim 15, wherein the performing of the norm operation comprises
obtaining similarity data by performing a sigmoid operation on the absolute value of the sum of the inverse value of the first feature vector and the second feature vector.

18. The operation method of claim 17, further comprising:
receiving an input on a similarity from a user of the electronic device; and
storing the inverse value of the similarity as a similarity threshold in a memory, wherein the calculating of the similarity comprises:
  performing a comparison operation on the similarity data and the similarity threshold through the operation circuit, and
  determining whether to execute a voice assistant application, based on a result of the comparison operation.

19. The operation method of claim 15, wherein the operation circuit comprises:
  at least one multiplexer configured to selectively select and output one of external data input from a buffer memory included in the electronic device and data input from a configuration included in the operation circuit;
  at least one accumulator configured to accumulate the output of the at least one multiplexer;
  an adder configured to perform an addition operation based on an output value of the at least one multiplexer;
  a multiplier configured to perform a multiplication operation based on an output value of the at least one multiplexer; and
  a two's complement circuit configured to perform a two's complement operation based on the output value of the accumulator.

20. A keyword detection accelerator for performing a neural network operation comprising:
  an audio signal processor;
  a buffer memory;
  an operation circuit configured to perform a norm operation; and
  at least one processor operatively connected to the audio signal processor, the buffer memory, and the operation circuit,
  wherein the at least one processor stores a first feature vector for a first speech signal obtained through the audio signal processor as an inverse value in the buffer memory, and
  wherein the at least one processor is configured to:
    obtain a second voice signal streamed through the audio signal processor,
    perform the norm operation on the first feature vector and a second feature vector based on a second feature vector for a second speech signal and the inverse value of the first feature vector through the operation circuit, wherein the norm operation comprises at least one of an operation of calculating an absolute value of a sum of the inverse value of the first feature vector and the second feature vector, or an operation of calculating a square value of the sum of the inverse value of the first feature vector and the second feature vector, and
    calculate a similarity between the first feature vector and the second feature vector, by using a result of the norm operation.

* * * * *